US011252616B2

(12) United States Patent
Liu et al.

(10) Patent No.: US 11,252,616 B2
(45) Date of Patent: Feb. 15, 2022

(54) MOBILITY MANAGEMENT METHOD, ACCESS NETWORK DEVICE, AND TERMINAL DEVICE

(71) Applicant: HUAWEI TECHNOLOGIES CO., LTD., Guangdong (CN)

(72) Inventors: Jing Liu, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 16/574,776

(22) Filed: Sep. 18, 2019

(65) Prior Publication Data
US 2020/0015132 A1   Jan. 9, 2020

Related U.S. Application Data

(63) Continuation of application No. PCT/CN2018/082693, filed on Apr. 11, 2018.

(30) Foreign Application Priority Data

Apr. 11, 2017   (CN) .......................... 201710233724.4

(51) Int. Cl.
*H04W 36/00* (2009.01)
*H04W 76/27* (2018.01)
(Continued)

(52) U.S. Cl.
CPC . *H04W 36/0033* (2013.01); *H04W 36/00837* (2018.08); *H04W 36/14* (2013.01);
(Continued)

(58) Field of Classification Search
CPC ............. H04W 36/0033; H04W 76/27; H04W 36/00837; H04W 36/14; H04W 36/30;
(Continued)

(56) References Cited

U.S. PATENT DOCUMENTS

| 2018/0110084 | A1 | 4/2018 | Dinan et al. | |
|---|---|---|---|---|
| 2019/0222291 | A1* | 7/2019 | Wang | H04W 36/06 |
| 2019/0387444 | A1* | 12/2019 | Byun | H04W 36/0072 |

FOREIGN PATENT DOCUMENTS

| CN | 104113875 A | 10/2014 |
|---|---|---|
| WO | 2014169830 A1 | 10/2014 |

OTHER PUBLICATIONS

CN107734568—Method, Device and Equipment for Supporting the Movement of User Equipment in Wireless Communication, pp. 1, 2, 12-16, 18-22, and 27, Aug. 11, 2016.*

(Continued)

*Primary Examiner* — Jackie Zuniga Abad
(74) *Attorney, Agent, or Firm* — Fish & Richardson P.C.

(57) ABSTRACT

According to the present disclosure, a mobility management method, an access network device, and a terminal device are disclosed. A base station system includes a centralized unit and a distributed unit, the centralized unit communicates with the distributed unit, and the distributed unit communicates with a terminal device through an air interface. An example method includes: selecting, by the centralized unit, a target cell as a secondary cell based on a measurement report reported by the terminal device, and sending configuration information of the target cell to the terminal device through the distributed unit; and receiving, by the centralized unit, primary cell change indication information sent by the distributed unit, performing air interface resource reconfiguration for the target cell based on the primary cell change indication information, generating reconfiguration information, and sending, by the centralized unit, the reconfiguration information to the terminal device through the distributed unit.

9 Claims, 18 Drawing Sheets

(51) Int. Cl.
  *H04W 36/14* (2009.01)
  *H04W 36/30* (2009.01)
  *H04W 36/38* (2009.01)
  *H04W 72/04* (2009.01)

(52) U.S. Cl.
  CPC ......... *H04W 36/30* (2013.01); *H04W 36/385* (2013.01); *H04W 72/0413* (2013.01); *H04W 76/27* (2018.02)

(58) Field of Classification Search
  CPC ........... H04W 36/385; H04W 36/0005; H04W 36/0055; H04W 88/085; H04W 36/0069
  See application file for complete search history.

(56) References Cited

OTHER PUBLICATIONS

U.S. Appl. No. 62/467,830, pp. 4-6, Mar. 7, 2017.*

Ericsson, "PCell change procedure for CA in NR," 3GPP TSG-RAN WG2 NR Ad Hoc Spokane, USA, Jan. 17-19, 2017, R2-1700415, 2 pages.

Huawei, HiSilicon, "0ms mobility interruption in NR," 3GPP TSG-RAN WG2 Meeting #96, Reno, Nevada, Nov. 14-18, 2016, R2-168564, 6 pages.

PCT International Search Report and Written Opinion issued in International Application No. PCT/CN2018/082693 dated Jul. 4, 2018, 15 pages.

KDDI, "Discussion on the possible issues of RRC in Function Split" 3GPP Draft; R2-1701658, vol. RAN WG2, No. XP051212247, Athens, Greece, Feb. 13-17, 2017, 4 pages.

CATT, "NR mobility enhancement" 3GPP Draft, R2-1700972, vol. RAN WG2, No. XP051210805,Spokane, USA, Jan. 17-19, 2017, 4 pages.

LG Electronics Inc, "Issue on retransmission for lost RLC PDUs" 3GPP Draft, R3-170982, vol. RAN WG3, No. XP051245709, Spokane, Washington, USA, Apr. 3-7, 2017, 3 pages.

Extended European Search Report issued in European Application No. 18784980.7 dated Jan. 16, 2020, 19 pages.

* cited by examiner

MOBILITY MANAGEMENT METHOD, ACCESS NETWORK DEVICE, AND TERMINAL DEVICE

CROSS-REFERENCE TO RELATED APPLICATIONS

This application is a continuation of International Application No. PCT/CN2018/082693, filed on Apr. 11, 2018, which claims priority to Chinese Patent Application No. 201710233724.4, filed on Apr. 11, 2017. The disclosures of the aforementioned applications are hereby incorporated by reference in their entireties.

TECHNICAL FIELD

Embodiments of the present invention relate to communications technologies, and in particular, to a mobility management method, an access network device, and a terminal device.

BACKGROUND

With rapid development of requirements and technologies for terminal devices, a 5th generation mobile communications (the 5th Generation mobile communication technology, 5G) system or a new radio access technology (New radio, NR) system is upcoming. The 5G system or the NR system can provide a transmission rate higher than that in a long term evolution (Long Term Evolution, LTE) network, and has a highest theoretical transmission rate up to dozens of gigabytes (Gigabyte, Gb for short) per second.

In an existing 2G/3G/4G network, an access network architecture basically includes a core network and access networks, and the access networks are basically not interconnected to each other at a service layer. For example, an Iur interface in 3G is used for signaling and data exchange between RNCs, and an X2 interface between base stations in 4G is mainly used for exchange of resource preparation signaling for handover of UE crossing base stations or signaling and data exchange between eNodeBs. Therefore, it is difficult to perform dynamic (semi-dynamic) collaborative adaptation from each of aspects such as resource coordination, processing load sharing, and interference suppression. From a perspective of equipment room deployment, both a physical station and a logical station are one-stop, are isolated from each other, and are not essentially associated with each other.

Currently, in 5G, when a base station (gNB) includes a centralized unit (Centralized Unit, CU) and a distributed unit (Distributed Unit, DU), the CU is usually responsible for centralized radio resource and connection management control, and the DU usually includes a processing function of implementing a distributed user plane, and mainly processes a physical-layer function and a layer-2 function that has a relatively high real-time performance requirement.

The CU device processes functions of wireless higher-layer protocol stacks such as a radio resource control (Radio Resource Control, RRC) layer and a packet data convergence protocol (Packet Data Convergence Protocol, PDCP) layer, can even also support transferring of some core network functions to an access network referred to as an edge computing network, and can satisfy a higher requirement of an emerging service such as a video, online shopping, or virtual/augmented reality for a network delay in a future communications network. Just because of changes in communications network elements and structures, each protocol stack is correspondingly adjusted and changed. Therefore, for naming of a next-generation network, 5G NR (New Radio) vividly describes various revolutionary changes of a future 5G network.

The CU covers higher-layer protocol stacks of the radio access network and some functions of the core network, and the DU covers some physical-layer and layer-2 functions for baseband processing. CUs may be deployed in a centralized manner, and deployment of DUs depends on an actual network environment. In a core urban area or an area having a relatively high traffic density, a relatively small inter-site distance, and limited equipment room resources, for example, a university or a large-scale performance venue, DUs may also be deployed in a centralized manner, and in an area having relatively sparse traffic and a relatively large inter-site distance, for example, a suburban county or a mountainous area, DUs may be deployed in a distributed manner.

In an existing long term evolution (Long Term Evolution, LTE) system, if an RRC connection reconfiguration (RRC Connection Reconfiguration) message received by a terminal device includes mobility control information (mobility Control Info parameter) when the terminal device performs cell handover, the terminal device is to perform the following processing: resetting a media access control (Media Access Control, MAC) layer (reset MAC), re-establishing a radio link control (Radio Link Control, RLC) layer (re-establish RLC), and re-establishing a PDCP layer (re-establish PDCP).

For MAC layer resetting, the terminal device is to stop all related timers, flush a HARQ buffer, and initialize all related variables.

For RLC layer re-establishment, the terminal device is to stop and reset all related timers, discard all RLC protocol data units (Protocol Data Unit, PDU) or RLC PDU segments that cannot be restored to an RLC service data unit (Service Data Unit, SDU), and initialize all related variables.

Similarly, a PDCP layer re-establishment process is similar to an RLC layer re-establishment process.

In short, when performing handover, the terminal device needs to perform a MAC layer resetting process, an RLC layer re-establishment process, and a PDCP layer re-establishment process.

In a 5G system, a gNB may use a CU-DU architecture, where CU and DU functions are divided in a plurality of possible manners. For example, FIG. 1 is a schematic structural diagram of a base station protocol layer of a 5G system in the prior art. A CU includes an RRC layer and a PDCP layer, and a DU includes an RLC layer, a MAC layer, and a physical layer (Physical Layer, PHY).

However, there is currently no technical solution for how to perform mobility management for different handover scenarios in the current CU-DU based architecture. Therefore, how to perform mobility management for a handover operation of a terminal device to shorten a handover delay becomes a technical problem that needs to be resolved.

SUMMARY

According to a plurality of aspects of the present invention, a mobility management method, an access network device, and a terminal device are provided, to perform mobility management for a handover operation of a terminal device, thereby shortening a handover delay.

According to a first aspect of the present invention, a mobility management method is provided. A base station system includes a centralized unit and a distributed unit, the centralized unit communicates with the distributed unit, and the distributed unit communicates with a terminal device through an air interface. The method includes: selecting, by the centralized unit, a target cell as a secondary cell based on a measurement report reported by the terminal device, and sending configuration information of the target cell to the terminal device through the distributed unit; and receiving, by the centralized unit, primary cell change indication information sent by the distributed unit, performing air interface resource reconfiguration for the target cell based on the primary cell change indication information, generating reconfiguration information, and sending, by the centralized unit, the reconfiguration information to the terminal device through the distributed unit.

Optionally, after the sending, by the centralized unit, configuration information of the target cell to the terminal device through the distributed unit, the method further includes: sending, by the centralized unit, activation indication information to the distributed unit, where the activation indication information is used to instruct the distributed unit to send a physical downlink control channel (PDCCH) activation command to the terminal device, and the PDCCH activation command is used to instruct the terminal device to activate the target cell.

Optionally, after the centralized unit sends the configuration information of the target cell to the terminal device through the distributed unit, after the distributed unit further sends a PDCCH activation command to the terminal device, the centralized unit receives activation acknowledgment indication information sent by the distributed unit, where the PDCCH activation command is used to instruct the terminal device to activate the target cell, and the activation acknowledgment indication information is used to indicate, to the centralized unit, that the target cell has been activated; or after the centralized unit sends the configuration information of the target cell to the terminal device through the distributed unit, before the distributed unit sends a PDCCH activation command to the terminal device, the centralized unit receives activation indication information sent by the distributed unit, where the PDCCH activation command is used to instruct the terminal device to activate the target cell, and the activation indication information is used to instruct the centralized unit to activate the target cell.

Optionally, the centralized unit further sends first indication information to the terminal device through the distributed unit, where the first indication information is used to indicate that the terminal device does not need to re-establish a radio link control (RLC) layer and/or does not need to re-establish a packet data convergence protocol (PDCP) layer in a primary cell change process.

Optionally, the centralized unit further sends second indication information to the distributed unit, where the second indication information is used to indicate that the distributed unit does not need to re-establish the radio link control (RLC) layer.

Optionally, the reconfiguration information includes at least one of the following: a signaling radio bearer (SRB) configuration and a physical uplink control channel (PUCCH) configuration.

According to a second aspect of the present invention, a mobility management method is provided. A base station system includes a centralized unit and at least a first and a second distributed units, and the centralized unit communicates with the at least the first and the second distributed units. The method includes: selecting, by the centralized unit, the second distributed unit as a secondary base station based on a measurement report reported by a terminal device, and sending configuration information of a target cell administered by the second distributed unit to the terminal device through the first distributed unit; determining, by the centralized unit, that the terminal device needs to perform a primary cell change between the first distributed unit and the second distributed unit, performing air interface resource reconfiguration for the target cell administered by the second distributed unit, and generating reconfiguration information; and sending, by the centralized unit, the reconfiguration information to the terminal device.

Optionally, before the centralized unit selects the second distributed unit as the secondary base station, the centralized unit allocates a cell-radio network temporary identifier (C-RNTI) resource pool to each of the first distributed unit and the second distributed unit, where C-RNTIs in C-RNTI resource pools are not duplicate; and the centralized unit receives a radio resource control (RRC) connection setup request message and a C-RNTI/T-CRNTI sent by the first distributed unit, where the C-RNTI/T-CRNTI is selected, when the terminal device accesses the first distributed unit, by the first distributed unit from the C-RNTI resource pool belonging to the first distributed unit and is allocated to the terminal device.

Optionally, the centralized unit further sends third indication information to the terminal device, where the third indication information is used to indicate that the terminal device does not need to reset a media access control (MAC) layer, does not need to re-establish a radio link control (RLC) layer, and does not need to re-establish a packet data convergence protocol (PDCP) layer in a primary cell change process.

Optionally, the reconfiguration information includes at least a signaling radio bearer (SRB) configuration.

According to a third aspect of the present invention, an access network device is provided. The access network device communicates with a distributed unit, and the distributed unit communicates with a terminal device through an air interface. The access network device includes: a receiver, configured to receive a measurement report reported by the terminal device; a processor, configured to select a target cell as a secondary cell based on the measurement report reported by the terminal device; and a transmitter, configured to send configuration information of the target cell to the terminal device through the distributed unit, where the receiver is further configured to receive primary cell change indication information sent by the distributed unit, where the primary cell change indication information is sent by the distributed unit after determining, based on channel state information reported by the terminal device, that the terminal device needs to change a primary cell administered by the distributed unit; the processor is further configured to perform air interface resource reconfiguration for the target cell based on the primary cell change indication information and generate reconfiguration information; and the transmitter is further configured to send the reconfiguration information to the terminal device through the distributed unit.

Optionally, the transmitter is further configured to: after sending the configuration information of the target cell to the terminal device through the distributed unit, send activation indication information to the distributed unit, where the activation indication information is used to instruct the distributed unit to send a physical downlink control channel (PDCCH) activation command to the terminal device, and the PDCCH activation command is used to instruct the terminal device to activate the target cell.

Optionally, the receiver is further configured to receive activation acknowledgment indication information sent by the distributed unit after the distributed unit sends a PDCCH activation command to the terminal device, where the PDCCH activation command is used to instruct the terminal device to activate the target cell, and the activation acknowledgment indication information is used to indicate, to a centralized unit, that the target cell has been activated; or the receiver is further configured to: before the distributed unit sends a PDCCH activation command to the terminal device, receive activation indication information sent by the distributed unit, where the PDCCH activation command is used to instruct the terminal device to activate the target cell, and the activation indication information is used to instruct the processor to activate the target cell.

Optionally, the transmitter is further configured to send first indication information to the terminal device through the distributed unit, where the first indication information is used to indicate that the terminal device does not need to re-establish a radio link control (RLC) layer and/or does not need to re-establish a packet data convergence protocol (PDCP) layer in a primary cell change process.

Optionally, the transmitter is further configured to send second indication information to the distributed unit, where the second indication information is used to indicate that the distributed unit does not need to re-establish the radio link control (RLC) layer.

Optionally, the reconfiguration information includes at least one of the following: a signaling radio bearer (SRB) configuration and a physical uplink control channel (PUCCH) configuration.

According to a fourth aspect of the present invention, an access network device is provided. The access network device communicates with at least a first and a second distributed units. The access network device includes: a receiver, configured to receive a measurement report reported by a terminal device; a processor, configured to select the second distributed unit as a secondary base station based on the measurement report reported by the terminal device; and a transmitter, configured to send configuration information of a target cell administered by the second distributed unit to the terminal device through the first distributed unit, where the processor is further configured to determine that the terminal device needs to perform a primary cell change between the first distributed unit and the second distributed unit, perform air interface resource reconfiguration for the target cell administered by the second distributed unit, and generate reconfiguration information; and the transmitter is further configured to send the reconfiguration information to the terminal device.

Optionally, the processor is further configured to: before selecting the second distributed unit as the secondary base station, allocate a cell-radio network temporary identifier (C-RNTI) resource pool to each of the first distributed unit and the second distributed unit, where C-RNTIs in C-RNTI resource pools are not duplicate; and the receiver is further configured to receive a radio resource control (RRC) connection setup request message and a C-RNTI/T-CRNTI sent by the first distributed unit, where the C-RNTI/T-CRNTI is selected, when the terminal device accesses the first distributed unit, by the first distributed unit from the C-RNTI resource pool belonging to the first distributed unit and is allocated to the terminal device.

Optionally, the transmitter is further configured to further send third indication information to the terminal device, where the third indication information is used to indicate that the terminal device does not need to reset a media access control (MAC) layer, does not need to re-establish a radio link control (RLC) layer, and does not need to re-establish a packet data convergence protocol (PDCP) layer in a primary cell change process.

According to a fifth aspect of the present invention, a mobility management method is provided. A base station system includes a centralized unit and at least one distributed unit, the centralized unit communicates with the at least one distributed unit, and the at least one distributed unit communicates with a terminal device through an air interface. The method includes: determining, by the centralized unit based on a measurement report reported by the terminal device, that the terminal device needs to perform cell handover; and sending, by the centralized unit, a cell handover command carrying first indication information to the terminal device, where the first indication information is used to indicate whether the terminal device re-establishes a radio link control (RLC) layer and/or whether the terminal device re-establishes a packet data convergence protocol (PDCP) layer in a cell handover process.

Optionally, when the terminal device performs cell handover between different cells administered by a same distributed unit and does not perform a key update, the first indication information is used to indicate that the terminal device does not need to re-establish the RLC layer and does not need to re-establish the PDCP layer in the cell handover process.

Optionally, the centralized unit further sends second indication information to the distributed unit, where the second indication information is used to indicate that the distributed unit does not need to re-establish the RLC layer.

Optionally, when the terminal device performs cell handover between different cells administered by a same distributed unit and performs a key update, the first indication information is used to indicate that the terminal device needs to re-establish the RLC layer and needs to re-establish the PDCP layer in the cell handover process.

Optionally, the first indication information is a parameter related to a key update, and the parameter is used to instruct the terminal device to perform a key update and used to implicitly indicate that the terminal device needs to re-establish the RLC layer and re-establish the PDCP layer in the cell handover process.

Optionally, the centralized unit further sends third indication information to the distributed unit, where the third indication information includes an identifier used to indicate a target cell to which the terminal device performs cell handover, and air interface resource configuration information corresponding to the target cell.

Optionally, when the terminal device performs cell handover between cells administered by different distributed units and does not perform a key update, the first indication information is used to indicate that the terminal device does not need to reset a media access control (MAC) layer, does not need to re-establish the RLC layer, and does not need to re-establish the PDCP layer in the cell handover process.

According to a sixth aspect of the present invention, an access network device is provided. The access network device communicates with at least one distributed unit, and the at least one distributed unit communicates with a terminal device through an air interface. The access network device includes: a receiver, configured to receive a measurement report reported by the terminal device; a processor, configured to determine, based on the measurement report reported by the terminal device, that the terminal device needs to perform cell handover; and a transmitter, configured to send a cell handover command carrying first indication information to the terminal device, where the first indication information is used to indicate whether the terminal device re-establishes a radio link control (RLC) layer and/or whether the terminal device re-establishes a packet data convergence protocol (PDCP) layer in a cell handover process.

Optionally, when the terminal device performs cell handover between different cells administered by a same distributed unit and does not perform a key update, the first indication information is used to indicate that the terminal device does not need to re-establish the RLC layer and does not need to re-establish the PDCP layer in the cell handover process.

Optionally, the transmitter is further configured to send second indication information to the distributed unit, where the second indication information is used to indicate that the distributed unit does not need to re-establish the RLC layer.

Optionally, when the terminal device performs cell handover between cells administered by different distributed units and does not perform a key update, the first indication information is used to indicate that the terminal device does not need to reset a media access control (MAC) layer, does not need to re-establish the RLC layer, and does not need to re-establish the PDCP layer in the cell handover process.

According to the mobility management method, the apparatus, and the terminal device, a handover delay can be reduced.

DESCRIPTION OF EMBODIMENTS

Figure 1:
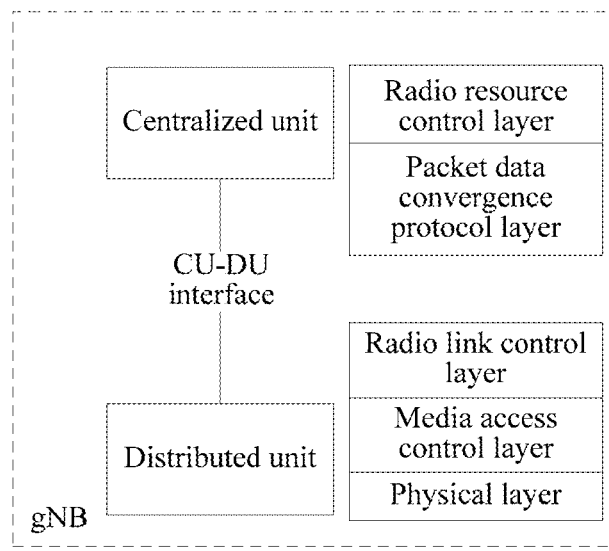
FIG. 1 is a schematic structural diagram of a base station protocol layer of a 5G system in the prior art.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

"First", "second", and similar terms mentioned in this specification do not indicate any order, quantity, or significance, but are only used to distinguish between different components. Likewise, "a/an", "one", or a similar term is not intended to indicate a quantity limitation either, but is intended to indicate that there is at least one. "Connection", "link", or a similar term is not limited to a physical or mechanical connection, but may include an electrical connection, regardless of whether the connection is direct or indirect.

A "module" mentioned in this specification is usually a program or an instruction that is stored in a memory and that can implement some functions. A "unit" mentioned in this specification is usually a functional structure obtained through division based on logic. The "unit" may be implemented by only hardware, or implemented by a combination of software and hardware.

"A plurality of" mentioned in this specification means at least two. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Technologies described in this specification may be applied to various communications systems, for example, current 2G and 3G communications systems and a new radio access network, for example, a global system for mobile communications (Global System for Mobile Communications, GSM), a code division multiple access (Code Division Multiple Access, CDMA) system, a time division multiple access (Time Division Multiple Access, TDMA) system, a wideband code division multiple access (Wideband Code Division Multiple Access, WCDMA) system, a frequency division multiple access (Frequency Division Multiple Addressing, FDMA) system, an orthogonal frequency-division multiple access (Orthogonal Frequency-Division Multiple Access, OFDMA) system, a single-carrier FDMA (SC-FDMA) system, a general packet radio service (General Packet Radio Service, GPRS) system, a long term evolution (Long Term Evolution, LTE) system, a UMTS network, and other similar communications systems. The new radio access network can provide a higher transmission rate than an LTE network. The new radio access network is also referred to as a 5G network, a next generation network, or the like.

Various aspects are described in this specification with reference to a terminal device and/or a base station and/or a base station controller.

The terminal device (Terminal Device) may be a wireless terminal or a wired terminal. The wireless terminal may be a device that provides a terminal device with voice and/or data connectivity, a handheld device with a wireless connection function, or another processing device connected to a wireless modem. The wireless terminal may communicate with one or more core networks through a radio access network (for example, RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (Personal Communication Service, PCS) phone, a cordless phone, a session initiation protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), user equipment (User Equipment), or a user agent (User Agent).

The base station (namely, a node) may be a device that communicates with the wireless terminal over an air interface in an access network by using one or more sectors. The base station may be configured to mutually convert a received over-the-air frame and an IP packet and serve as a router between the wireless terminal and a rest part of the access network, where the rest part of the access network may include an internet protocol (IP) network. The base station may further coordinate attribute management of the air interface. For example, the base station may be a base transceiver station (Base Transceiver Station, BTS) in a GSM system or a CDMA system, may be a NodeB (NodeB) in a WCDMA system, or may be an evolved NodeB (eNodeB, eNB, or e-NodeB) in an LTE system. This is not limited in this application. An access network device of the new radio access network is also referred to as a gNB (gNB), an NR Node (node), or an NR BS (base station, Base Station). This is not limited herein. However, for ease of description, the access network device is collectively referred to as a gNB in this specification.

The base station controller (namely, a control node) may be a base station controller (Base Station Controller, BSC) in GSM or CDMA, or may be a radio network controller (Radio Network Controller, RNC) in WCDMA. This is not limited in this application.

In this specification, cell handover means that a terminal device is handed over from a cell to another cell, and a primary cell change means that a primary cell is changed. For example, for a carrier aggregation (Carrier Aggregation, CA) scenario, a source cell is changed from a primary cell (primary cell, PCell) to a secondary cell (secondary cell, SCell), and a target cell is changed from an SCell to a PCell. For a dual connectivity (dual connectivity, DC) scenario, a source DU cell is changed from a PCell to a PSCell, and a target DU cell is changed from a PSCell to a PCell. For cell handover, UE is handed over from a source cell to a target cell.

Figure 2:
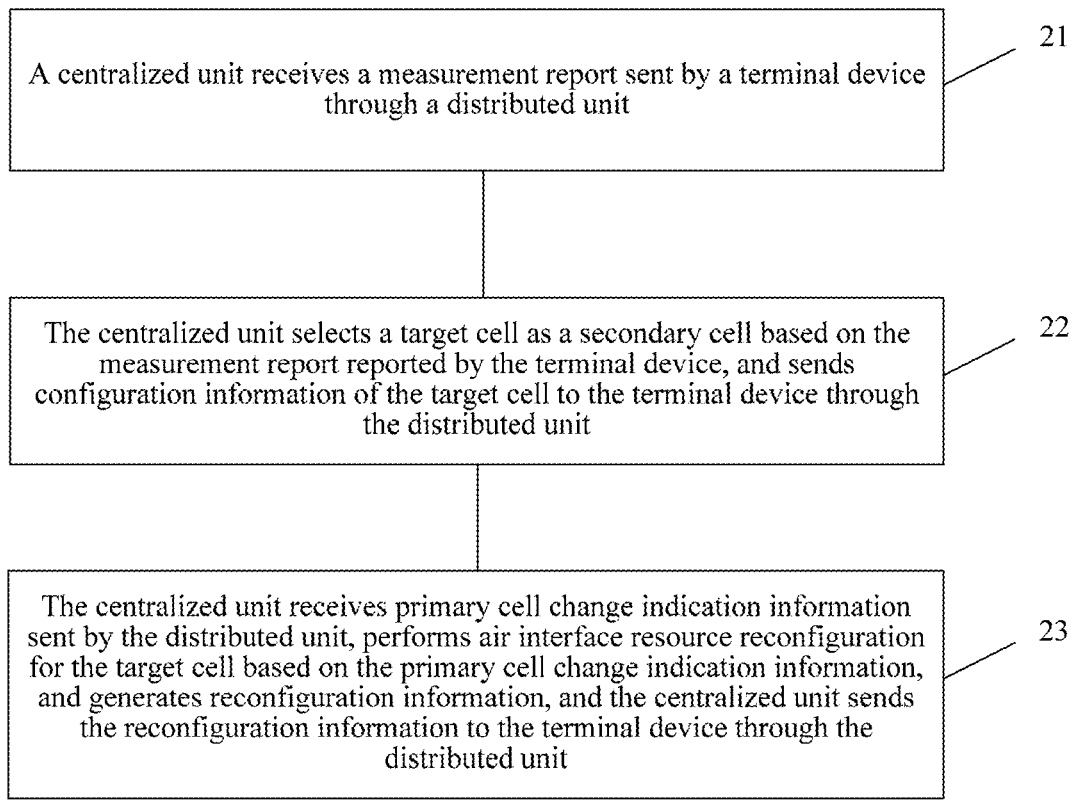
FIG. 2 is a schematic flowchart of a mobility management method according to an embodiment of the present invention.

FIG. 2 is a schematic flowchart of a mobility management method according to an embodiment of the present invention. A base station system includes a centralized unit and a distributed unit. The centralized unit communicates with the distributed unit in a wired or wireless manner. The distributed unit communicates with a terminal device through an air interface. The centralized unit may be a CU in a 5G NR system. The distributed unit may be a DU in the 5G NR system. In this embodiment, the terminal device moves between two cells administered by the distributed unit.

Step 21. The centralized unit receives a measurement report sent by the terminal device through the distributed unit.

For example, the measurement report carries information about signal quality of each cell that is administered by the distributed unit and that is found by the terminal device through scanning, for example, reference signal received power (Reference Signal Receiving Power, RSRP) or reference signal received quality (Reference Signal Receiving Quality, RSRQ).

Step 22. The centralized unit selects a target cell as a secondary cell based on the measurement report reported by the terminal device, and sends configuration information of the target cell to the terminal device through the distributed unit.

For example, the terminal device is located in a source cell, that is, a primary cell (primary cell, PCell), administered by the distributed unit, and the centralized unit selects, based on the measurement report reported by the terminal device, a cell whose signal quality reaches a particular threshold as a target cell, and sets the target cell as a secondary cell (secondary cell, SCell). To be specific, the source cell and the target cell administered by the distributed unit are both used by the terminal device to perform a carrier aggregation (Carrier Aggregation, CA) operation. Then the centralized unit sends configuration information of the target cell to the terminal device through the distributed unit. For example, the configuration information includes a cell index (SCell index) corresponding to the target cell, a system broadcast message of the target cell, a physical layer configuration of the target cell, and a MAC layer configuration of the target cell.

Step 23. The centralized unit receives primary cell change indication information sent by the distributed unit, performs air interface resource reconfiguration for the target cell based on the primary cell change indication information, and generates reconfiguration information, and the centralized unit sends the reconfiguration information to the terminal device through the distributed unit.

For example, the distributed unit determines, based on channel state information (CSI) reported by the terminal device, that the terminal device needs to change the primary cell administered by the distributed unit (for example, channel quality of the target cell is better than signal quality of the source cell), the source cell is changed from a source PCell to a new SCell, and the target cell is changed from a source SCell to a new PCell, where feedback of the CSI may be channel quality indication (channel quality indication, CQI) information. Then the distributed unit sends the primary cell change indication information to the centralized unit.

In another embodiment of the present invention, after the centralized unit sends the configuration information of the target cell to the terminal device through the distributed unit, the centralized unit further sends activation indication information to the distributed unit, where the activation indication information is used to instruct the distributed unit to send a physical downlink control channel (Physical Downlink Control Channel, PDCCH) activation command to the terminal device, and the PDCCH activation command is used to instruct the terminal device to activate the target cell.

In another embodiment of the present invention, after the centralized unit sends the configuration information of the target cell to the terminal device through the distributed unit, the distributed unit sends a PDCCH activation command to the terminal device. For example, the distributed unit may determine, based on CSI of the target cell, load of the target cell, or another situation, to send the PDCCH activation command to the terminal device, where the PDCCH activation command is used to instruct the terminal device to activate the target cell. The distributed unit sends activation acknowledgment indication information to the centralized unit, where the activation acknowledgment indication information is used to indicate, to the centralized unit, that the target cell has been activated. Alternatively, before the distributed unit sends a PDCCH activation command to the terminal device, the centralized unit receives activation indication information sent by the distributed unit, where the PDCCH activation command is used to instruct the terminal device to activate the target cell, and the activation indication information is used to instruct the centralized unit to activate the target cell.

In another embodiment of the present invention, the centralized unit further sends first indication information to the terminal device through the distributed unit, where the first indication information is used to indicate that the terminal device does not need to re-establish an RLC layer and/or does not need to re-establish a PDCP layer in a primary cell change process.

In another embodiment of the present invention, the centralized unit further sends second indication information to the distributed unit, where the second indication information is used to indicate that the distributed unit does not need to re-establish an RLC layer.

In another embodiment of the present invention, the reconfiguration information includes at least one of the following: a signaling radio bearer (Signaling Radio Bearer, SRB) configuration and a physical uplink control channel (Physical Uplink Control Channel, PUCCH) configuration. For example, the SRB configuration includes an SRB ID and an RLC layer configuration, a logical channel (Logic Channel, LC) configuration.

Figure 3:
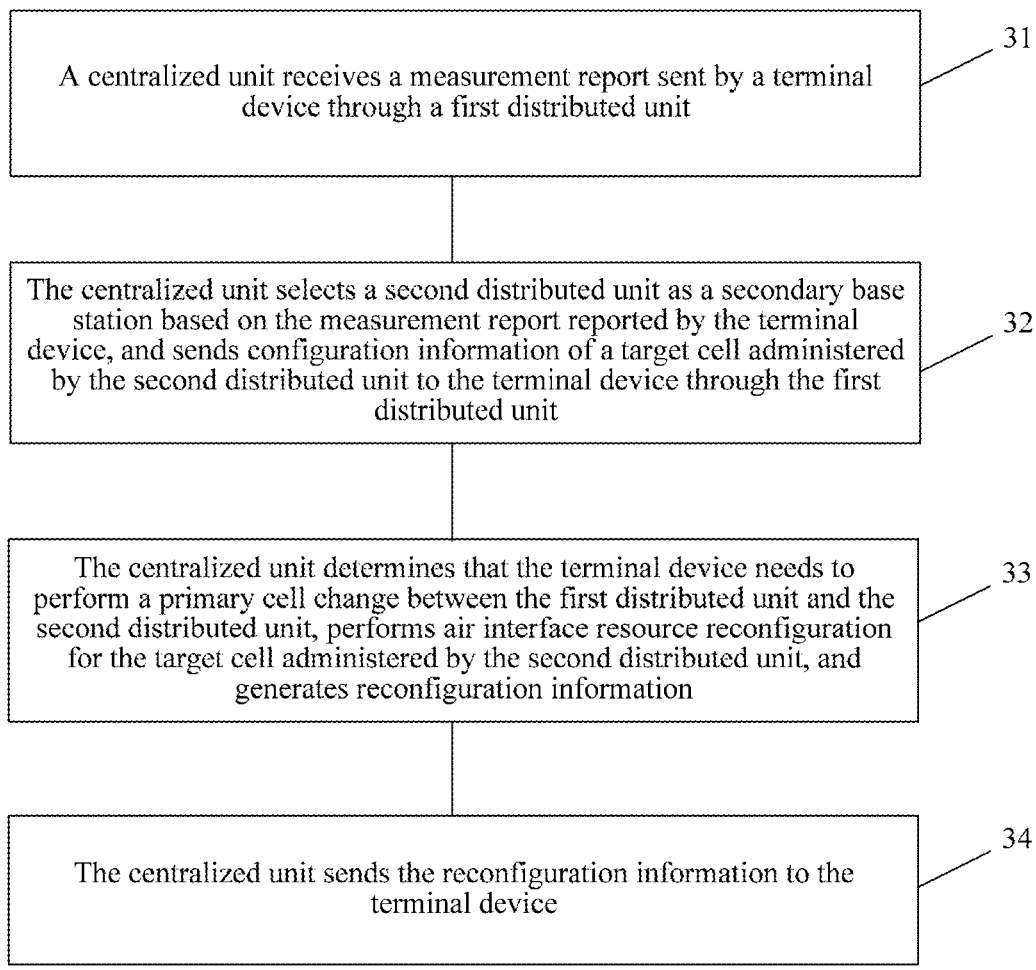
FIG. 3 is a schematic flowchart of a mobility management method according to another embodiment of the present invention.

FIG. 3 is a schematic flowchart of a mobility management method according to another embodiment of the present invention. A base station system includes a centralized unit and at least a first and a second distributed units. The centralized unit may be a CU in a 5G NR system. The distributed unit may be a DU in the 5G NR system. The centralized unit communicates with the at least the first and the second distributed units in a wired or wireless manner. A terminal device moves between cells separately administered by two different distributed units. For example, the terminal device may move from a first cell (that is, a source cell) administered by the first distributed unit to a second cell (that is, a target cell) administered by the second distributed unit.

Step 31. The centralized unit receives a measurement report sent by the terminal device through the first distributed unit.

For example, the measurement report carries information about signal quality that is of cells administered by the first distributed unit and the second distributed unit and that is measured by the terminal device, for example, RSRP or RSRQ.

Step 32. The centralized unit selects the second distributed unit as a secondary base station based on the measurement report reported by the terminal device, and sends configuration information of the target cell administered by the second distributed unit to the terminal device through the first distributed unit.

For example, the terminal device is located in the source cell administered by the first distributed unit, and the centralized unit determines, based on the measurement report reported by the terminal device, that signal quality of the target cell administered by the second distributed unit reaches a particular threshold, and selects the second distributed unit as the secondary base station. To be specific, the source cell and the target cell are both used by the terminal device to perform a dual connectivity (DC) operation. Then the centralized unit sends the configuration information of the target cell to the terminal device through the first distributed unit. For example, the configuration information includes an index of the target cell, a DRB configuration of the target cell, a physical layer/MAC layer/RLC layer/PDCP layer configuration of the target cell, and a logical channel configuration.

Step 33. The centralized unit determines that the terminal device needs to perform a primary cell change between the first distributed unit and the second distributed unit, performs air interface resource reconfiguration for the target cell administered by the second distributed unit, and generates reconfiguration information.

For example, the centralized unit determines that the signal quality of the target cell administered by the second distributed unit is higher than signal quality of the source cell administered by the first distributed unit, and determines that the terminal device needs to perform a primary cell change between the first distributed unit and the second distributed unit. To be specific, the source cell administered by the first distributed unit is changed from a source PCell to a new PSCell, and the target cell administered by the second distributed unit is changed from a source PSCell to a new PCell.

The reconfiguration information includes at least an SRB configuration, for example, an SRB ID, an RLC layer configuration, and an LC configuration.

Step 34. The centralized unit sends the reconfiguration information to the terminal device.

In another embodiment of the present invention, before the centralized unit selects the second distributed unit as the secondary base station, the centralized unit further allocates a cell-radio network temporary identifier (C-RNTI) resource pool to each of the first distributed unit and the second distributed unit, where C-RNTIs in C-RNTI resource pools are not duplicate; and the centralized unit receives a radio resource control (RRC) connection setup request message and a C-RNTI/T-CRNTI sent by the first distributed unit, where the C-RNTI/T-CRNTI is selected, when the terminal device accesses the first distributed unit, by the first distributed unit from the C-RNTI resource pool belonging to the first distributed unit and is allocated to the terminal device, and the T-CRNTI is a temporary CRNTI allocated by the first distributed unit in a random access process of the terminal device and is sent to the terminal device through a random access response (Random Access Response, RAR) message.

In another embodiment of the present invention, the centralized unit further sends third indication information to the terminal device, where the third indication information is used to indicate that the terminal device does not need to reset a MAC layer, does not need to re-establish an RLC layer, and does not need to re-establish a PDCP layer in a primary cell change process.

Figure 4:
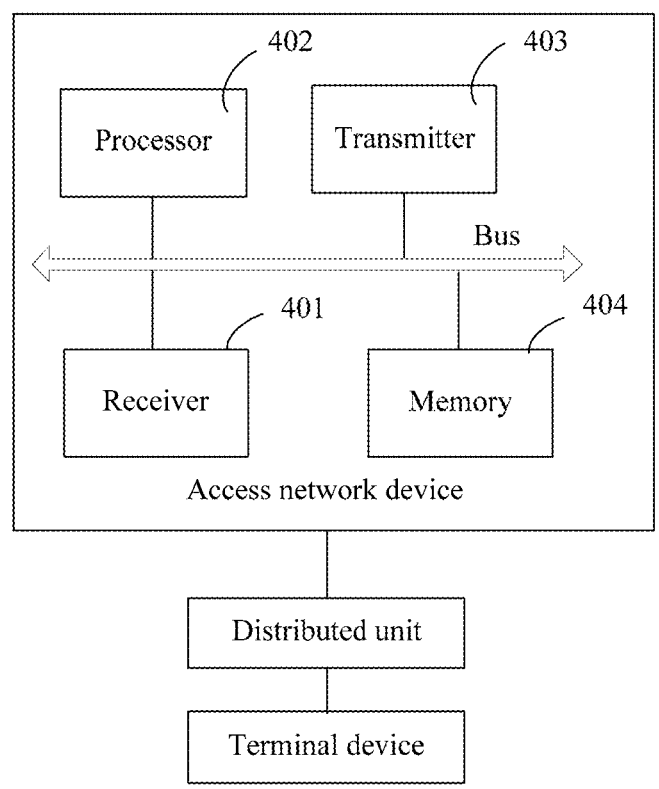
FIG. 4 is a schematic structural diagram of a communications system according to an embodiment of the present invention.

FIG. 4 is a schematic structural diagram of a communications system according to another embodiment of the present invention. The communications system includes an access network device and a distributed unit. The access network device communicates with the distributed unit in a wired or wireless manner. The distributed unit communicates with a terminal device through an air interface. The access network device may be a CU in a 5G NR system. The access network device includes: a receiver 401, a processor 402, a transmitter 403, and a memory 404. The receiver 401, the processor 402, the transmitter 403, and the memory 404 communicate with each other through a bus. In this embodiment, the terminal device moves between two cells administered by the distributed unit.

In this embodiment of this application, the processor 402 may be an erasable programmable logic device (Erasable Programmable Logic Device, EPLD), a field programmable gate array (Field Programmable Gate Array, FPGA), a digital signal processor (Digital Signal Processor, DSP) chip, an application-specific integrated circuit (Application-Specific Integrated Circuit, ASIC) or another programmable logic device, a discrete gate or transistor logic device, a discrete hardware component, or the like.

The memory 404 is configured to store code or instruction information, and may further store information about a device type. The memory 404 may include a read-only memory (Read-Only Memory, ROM) and a random access memory (Random Access Memory, RAM), and is configured to provide an instruction and data for the processor 402. A part of the memory 404 may further include a non-volatile random access memory.

The receiver 401 is configured to receive a measurement report reported by the terminal device.

For example, the measurement report carries information about signal quality that is of cells administered by the distributed unit and that is measured by the terminal device, for example, RSRP or RSRQ.

The processor 402 is configured to select a target cell as a secondary cell based on the measurement report reported by the terminal device.

For example, the terminal device is located in a source cell and communicates with the distributed unit, and the processor 402 selects, based on the measurement report reported by the terminal device, a cell whose signal quality reaches a particular threshold as a target cell, and sets the target cell as a secondary cell. To be specific, the source cell and the target cell administered by the distributed unit are both used by the terminal device to perform a CA operation.

The transmitter 403 is configured to send configuration information of the target cell to the terminal device through the distributed unit.

The configuration information includes a cell index (SCell index) corresponding to the target cell, a system broadcast message of the target cell, a physical layer configuration of the target cell, a MAC layer configuration of the target cell, and the like.

The receiver 401 is further configured to receive primary cell change indication information sent by the distributed unit, where the primary cell change indication information is sent by the distributed unit when the distributed unit determines, based on channel state information reported by the terminal device, that the terminal device needs to change a primary cell administered by the distributed unit.

The processor 402 is further configured to perform air interface resource reconfiguration for the target cell based on the primary cell change indication information and generate reconfiguration information.

The transmitter 403 is further configured to send the reconfiguration information to the terminal device through the distributed unit.

In another embodiment of the present invention, the transmitter 403 is further configured to: after sending the configuration information of the target cell to the terminal device through the distributed unit, send activation indication information to the distributed unit, where the activation indication information is used to instruct the distributed unit to send a PDCCH activation command to the terminal device, and the PDCCH activation command is used to instruct the terminal device to activate the target cell.

In another embodiment of the present invention, the receiver 401 is further configured to receive activation acknowledgment indication information sent by the distributed unit after the distributed unit sends a PDCCH activation command to the terminal device, where the PDCCH activation command is used to instruct the terminal device to activate the target cell, and the activation acknowledgment indication information is used to indicate, to a centralized unit, that the target cell has been activated. Alternatively, before the distributed unit sends a PDCCH activation command to the terminal device, the receiver 401 is further configured to receive activation indication information sent by the distributed unit, where the activation indication information is used to instruct the processor 402 to activate the target cell, and the PDCCH activation command is used to instruct the terminal device to activate the target cell.

In another embodiment of the present invention, the transmitter 403 is further configured to send first indication information to the terminal device through the distributed unit, where the first indication information is used to indicate that the terminal device does not need to re-establish an RLC layer and/or does not need to re-establish a PDCP layer in a primary cell change process.

In another embodiment of the present invention, the transmitter 403 is further configured to send second indication information to the distributed unit, where the second indication information is used to indicate that the distributed unit does not need to re-establish an RLC layer.

In another embodiment of the present invention, the reconfiguration information includes at least one of the following: an SRB configuration and a PUCCH. For example, the SRB configuration includes an SRB ID, an RLC layer configuration, and a logical channel (Logic Channel, LC) configuration.

Figure 5:
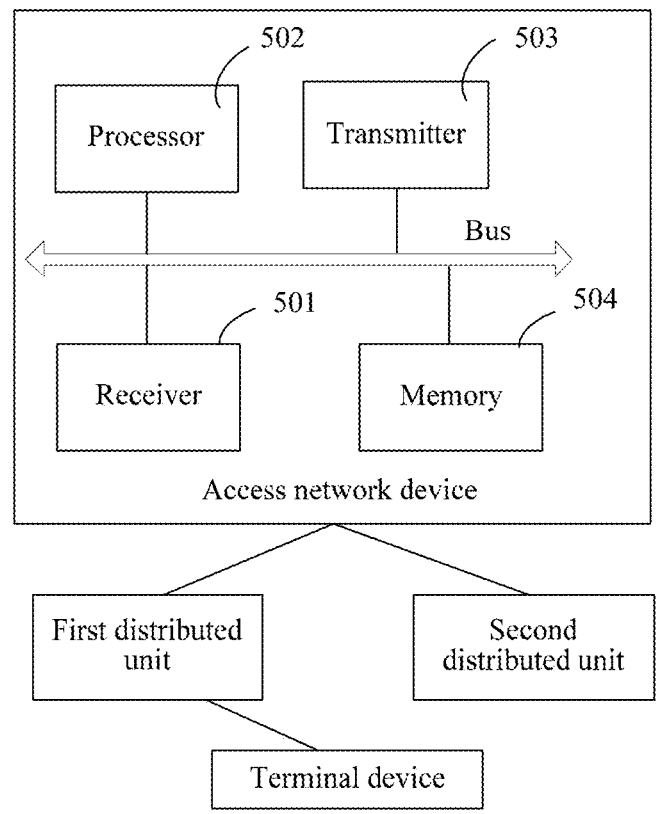
FIG. 5 is a schematic structural diagram of a communications system according to another embodiment of the present invention.

FIG. 5 is a schematic structural diagram of a communications system according to another embodiment of the present invention. The communications system includes an access network device and at least two distributed units. The at least two distributed units include a first distributed unit and a second distributed unit. The access network device communicates with the at least two distributed units in a wired or wireless manner. The distributed units communicate with a terminal device through air interfaces. The access network device may be a CU in a 5G NR system. The access network device includes: a receiver 501, a processor 502, a transmitter 503, and a memory 504. The receiver 501, the processor 502, the transmitter 503, and the memory 504 communicate with each other through a bus.

In this embodiment of this application, the processor 502 may be an EPLD, an FPGA, a DSP chip, an ASIC or another programmable logic device, a discrete gate or transistor logic device, discrete hardware component, or the like.

The memory 504 is configured to store code or instruction information, and may further store information about a device type. The memory 504 may include a ROM and a RAM, and is configured to provide an instruction and data for the processor 502. A part of the memory 504 may further include a non-volatile random access memory.

The receiver 501 is configured to receive a measurement report reported by the terminal device.

For example, the measurement report carries information about signal quality that is of cells administered by the first distributed unit and the second distributed unit and that is measured by the terminal device, for example, RSRP or RSRQ.

The processor 502 is configured to select the second distributed unit as a secondary base station based on the measurement report reported by the terminal device.

For example, the terminal device is located in the source cell administered by the first distributed unit and communicates with the first distributed unit, and the processor 502 determines, based on the measurement report reported by the terminal device, that signal quality of the target cell administered by the second distributed unit reaches a particular threshold, and selects the second distributed unit as the secondary base station. To be specific, the source cell and the target cell are both used by the terminal device to perform a dual connectivity (DC) operation.

The transmitter 503 is configured to send configuration information of the target cell administered by the second distributed unit to the terminal device through the first distributed unit.

For example, the configuration information includes an index of the target cell, a DRB configuration of the target cell, a physical layer/MAC layer/RLC layer/PDCP layer configuration of the target cell, and a logical channel configuration.

The processor 502 is further configured to determine that the terminal device needs to perform a primary cell change between the first distributed unit and the second distributed unit, perform air interface resource reconfiguration for the target cell administered by the second distributed unit, and generate reconfiguration information.

For example, the processor 502 determines that the signal quality of the target cell administered by the second distributed unit is higher than signal quality of the source cell administered by the first distributed unit, and determines that the terminal device needs to perform a primary cell change between the first distributed unit and the second distributed unit. To be specific, the source cell administered by the first distributed unit is changed from a PCell to a PSCell, and the target cell administered by the second distributed unit is changed from a PSCell to a PCell.

The transmitter 503 is further configured to send the reconfiguration information to the terminal device.

The reconfiguration information includes at least an SRB configuration, for example, an SRB ID, an RLC layer configuration, and an LC configuration.

In another embodiment of the present invention, the processor 502 is further configured to: before selecting the second distributed unit as the secondary base station, allocate a cell-radio network temporary identifier (C-RNTI) resource pool to each of the first distributed unit and the second distributed unit, where C-RNTIs in C-RNTI resource pools are not duplicate; and the receiver 501 is further configured to receive a radio resource control (RRC) connection setup request message and a C-RNTI sent by the first distributed unit, where the C-RNTI is selected, when the terminal device accesses the first distributed unit, by the first distributed unit from the C-RNTI resource pool belonging to the first distributed unit and is allocated to the terminal device.

In another embodiment of the present invention, the transmitter 503 is further configured to further send indication information to the terminal device, where the indication information is used to indicate that the terminal device does not need to reset a media access control (MAC) layer, does not need to re-establish a radio link control (RLC) layer, and does not need to re-establish a packet data convergence protocol (PDCP) layer in a primary cell change process.

Figure 6:
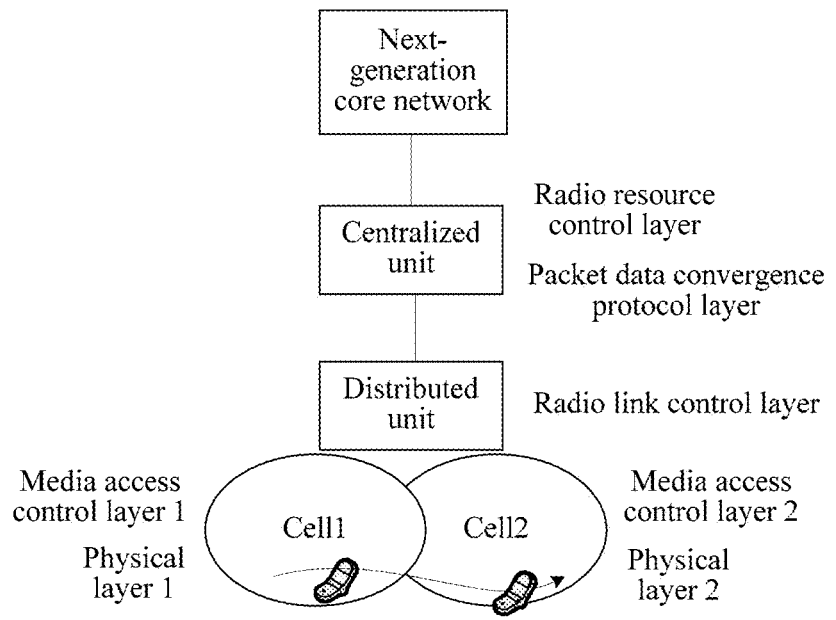
FIG. 6 is a schematic structural diagram of a communications system according to another embodiment of the present invention.

FIG. 6 is a schematic structural diagram of a communications system according to another embodiment of the present invention. The communications system is a 5G or next-generation communications system, and includes a next-generation core network (NG Core), a centralized unit (CU), and a distributed unit (DU). The CU communicates with the DU in a wired or wireless manner. The DU communicates with a terminal device through an air interface. The terminal device moves between different cells served by the same DU, for example, moves from a first cell (cell1) to a second cell (cell2). An RRC-layer function and a PDCP-layer function are located on the CU. An RLC-layer function, a MAC-layer function, and a PHY-layer function are located on the DU. Different cells served by the same DU may share the RLC-layer function. The cell1 served by the DU corresponds to MAC1 and PHY1, and the cell2 served by the DU corresponds to MAC2 and PHY2.

Before a primary cell change, the CU sends a PDCP PDU to an RLC layer of the DU through a PDCP layer, and communicates with the terminal device through MAC1 and PHY1 of the cell1 served by the DU. For example, data delivered by the CU is processed through the PDCP layer of the CU and then is changed into a PDCP PDU; the PDCP PDU is sent to the RLC layer of the DU, is processed through the RLC layer, and then is changed into an RLC PDU; the RLC PDU is processed through a MAC1 layer of the DU and then is changed into a MAC PDU; and the MAC PDU is processed through the PHY1 layer, then is sent to the terminal device, and then is processed sequentially through a PHY layer, a MAC layer, an RLC layer, and a PDCP layer of the terminal device. For example, data (Data) sent by the terminal device is sent to the PHY1 layer of the DU, is processed through the PHY1 layer, then is sent to the MAC1 layer for processing, and is changed into a MAC SDU; the MAC SDU is processed through the RLC layer of the DU and then is changed into an RLC SDU; and then the RLC SDU is sent to the PDCP layer of the CU.

For a scenario in FIG. 6, 0-ms interruption in a handover process may be implemented through a process of configuring a CA mode for the terminal device in advance and then performing a primary cell change (for example, PCell change).

Figure 7A:
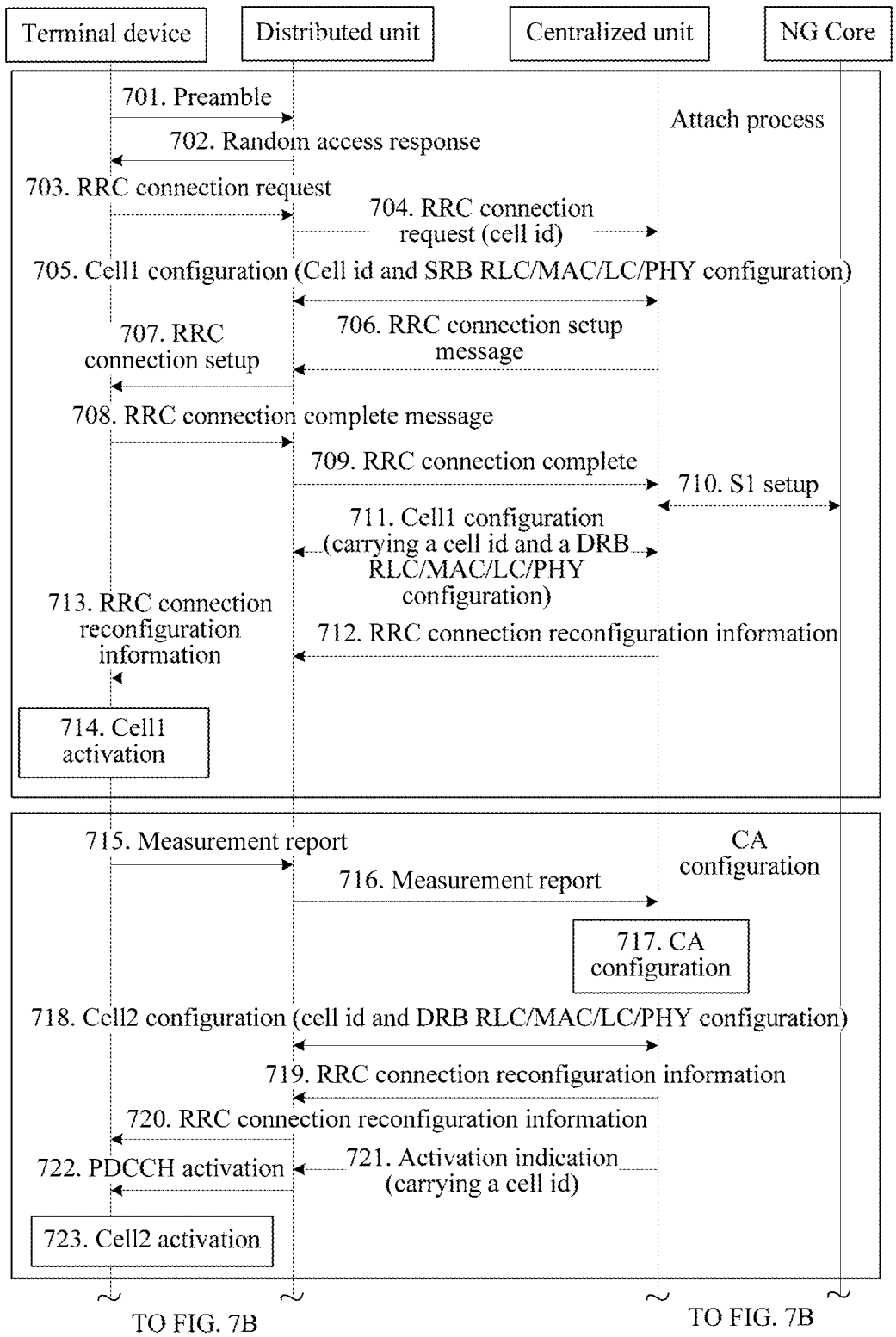
FIG. 7A and FIG. 7B are a schematic flowchart of a mobility management method according to another embodiment of the present invention.
Figure 7B:
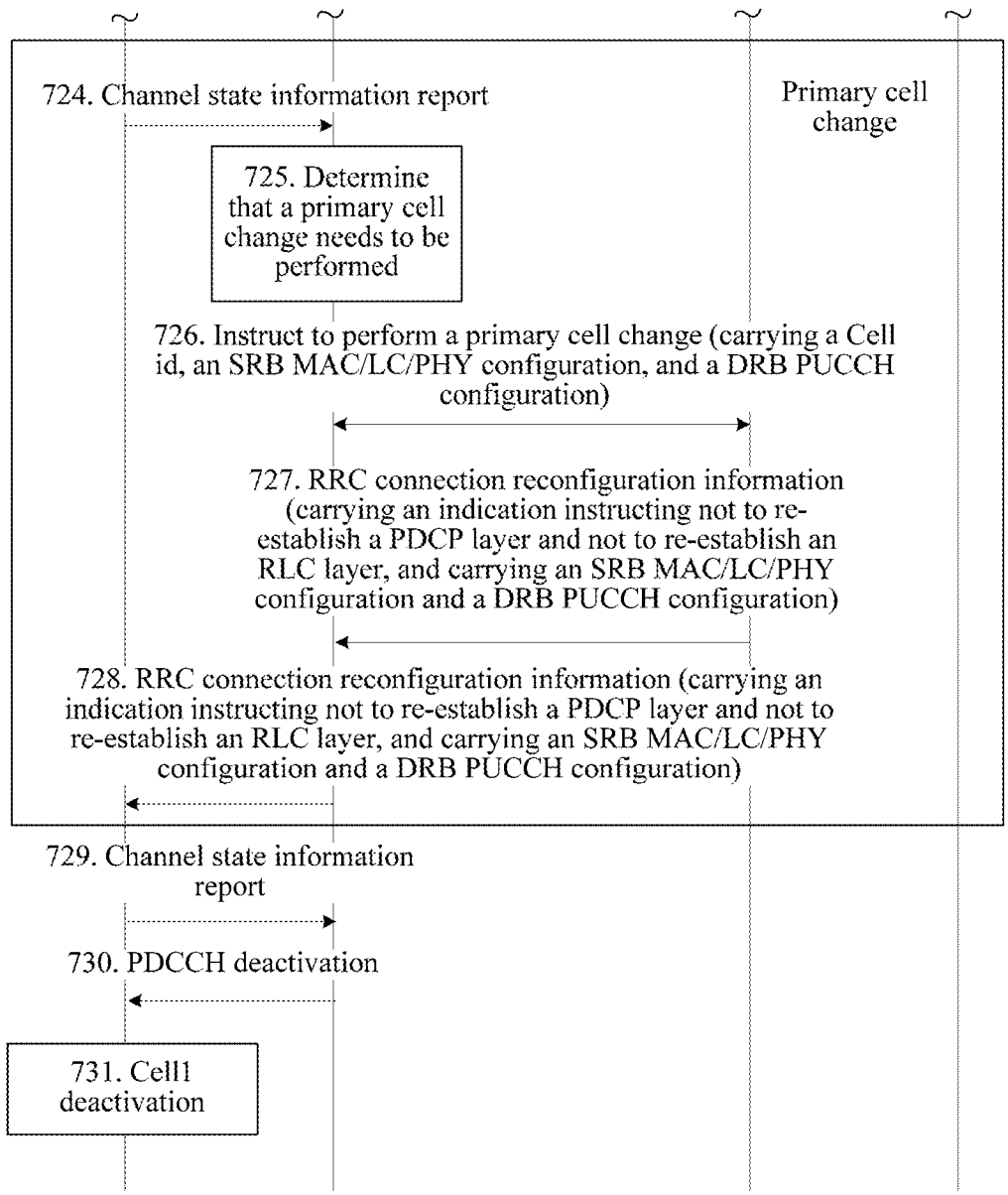

For example, when the terminal device enters coverage of the cell2, the CU configures the carrier aggregation (CA) mode for the terminal device in advance, and configures the cell1 as a primary cell (Primary cell, PCell) and the cell2 as a secondary cell (Secondary cell, SCell) for the terminal device. When signal quality of the cell2 is higher than signal quality of the cell1, a primary cell change (PCell change) process is performed, the cell1 is changed into an SCell, and the cell2 is changed into a PCell. For a control plane, the terminal device needs to configure an RRC connection for the cell2. For a user plane, the terminal device needs to configure a physical uplink control channel (Physical Uplink Control Channel, PUCCH) for the cell2. This specifically includes an attach (Attach) process, a CA configuration process, and a primary cell change process. FIG. 7A and FIG. 7B are a schematic flowchart of a mobility management method according to another embodiment of the present invention. The method is mainly described as follows:

Step 701. The terminal device sends a preamble (Preamble) to the DU.

Step 702. The terminal device receives a random access response (Random Access Response, RAR) sent by the DU.

Step 703. The terminal device sends an RRC connection request (RRC Connection Request) to the DU.

Step 704. The DU sends the RRC connection request to the CU.

The RRC connection request carries a cell identifier, that is, a cell1 ID.

Step 705. The CU sends cell1 configuration (cell1 config) information of a cell1 to the DU.

The cell1 configuration information includes a cell ID and a signaling radio bearer (Signaling Radio Bearer, SRB) configuration (for example, an SRB ID corresponding to an SRB, an RLC layer configuration, and a logical channel LC configuration), where the cell ID is the cell1 ID.

Step 706. The CU sends an RRC connection setup (RRC connection setup) message to the DU.

Step 707. The DU sends the RRC connection setup message to the terminal device.

Step 708. The terminal device sends an RRC connection complete (RRC connection complete) message to the DU.

Step 709. The DU sends the RRC connection complete message to the CU.

Step 710. The CU performs S1 interface setup (S1 setup) with the core network (NG core).

Step 711. The CU sends the cell1 configuration information to the DU.

The cell1 configuration information includes the cell ID and a data radio bearer (Data Radio Bearer, DRB) (for example, a DRB ID corresponding to the DRB, a PDCP layer configuration, an RLC layer configuration, and a logical channel LC configuration), where the cell ID is the cell1 ID.

Step 712. The CU sends RRC connection reconfiguration (RRC connection reconfiguration) information to the DU.

Step 713. The DU sends the RRC connection reconfiguration information to the terminal device.

Step 714. The terminal device activates the cell1.

Step 715. The terminal device sends a measurement report to the DU.

For example, the measurement report carries information about signal quality that is of cells administered by the distributed unit and that is measured by the terminal device, for example, RSRP or reference signal received quality RSRQ.

Step 716. The DU sends the measurement report to the CU.

Step 717. The CU performs a CA configuration.

For example, the CU selects, based on the measurement report reported by the terminal device, a cell whose signal quality reaches a particular threshold (for example, a cell2) as a target cell, and sets the cell2 as a secondary cell. To be specific, the cell1 (that is, a source cell) and the cell2 (that is, the target cell) administered by the distributed unit are both used by the terminal device to perform a CA operation.

Step 718. The CU sends cell2 configuration information to the DU.

The cell2 configuration information includes a cell ID and a DRB configuration (for example, a DRB ID, a PDCP configuration, an RLC configuration, and an LC configuration), where the cell ID is a cell2 ID.

Step 719. The CU sends RRC connection reconfiguration information to the DU.

Step 720. The DU sends the RRC connection reconfiguration information to the terminal device.

Step 721. The CU sends a cell activation indication carrying the cell2 ID to the DU.

Step 722. The DU sends a PDCCH activation indication carrying the cell2 ID to the terminal device.

Step 723. The terminal device activates the cell2.

Step 724. The terminal device sends a channel state information report (Channel Status Information report, CSI report) to the DU.

The channel state information report carries information about signal quality of the cell1 and the cell2.

Step 725. The DU determines that a primary cell change needs to be performed.

For example, when the DU determines, based on the channel state information report sent by the terminal device, that signal quality of the cell2 is higher than signal quality of the cell1, a primary cell change needs to be performed. To be specific, the cell1 is changed into an SCell, and the cell2 is changed into a PCell.

Step 726. The DU instructs the CU to perform a primary cell change operation (role change exchange).

For example, the CU performs a configuration for the cell2, for example, performs an SRB configuration and a PUCCH configuration for the cell2. For example, the cell ID of the cell2, the RLC configuration corresponding to the SRB, the LC configuration, and the DRB PUCCH configuration are sent to the DU.

Step 727. The CU sends RRC connection reconfiguration (RRC connection Reconfiguration) information to the DU.

The RRC connection reconfiguration information carries an indication instructing not to re-establish the PDCP layer and not to re-establish the RLC layer, and carries the SRB configuration and the PUCCH configuration of the cell2.

Step 728. The DU sends the RRC connection reconfiguration information to the terminal device.

The terminal device does not re-establish the PDCP layer and does not re-establish the RLC layer in a primary cell change process based on received indication information, and the terminal device needs only to perform an RRC connection and a PUCCH configuration for the cell2 based on the received configuration information.

Step 729. The terminal device sends a CSI report to the DU.

Step 730. The DU sends a PDCCH deactivation indication carrying the cell1 ID to the terminal device.

Step 731. The terminal device deactivates the cell1 based on the cell1 ID carried in the PDCCH deactivation indication.

In this embodiment, when the terminal device is moving, a link between the terminal device and the cell2 is established in advance, and L2 reset is not performed, thereby ensuring 0-ms interruption during handover and reducing a handover delay.

Figure 8:
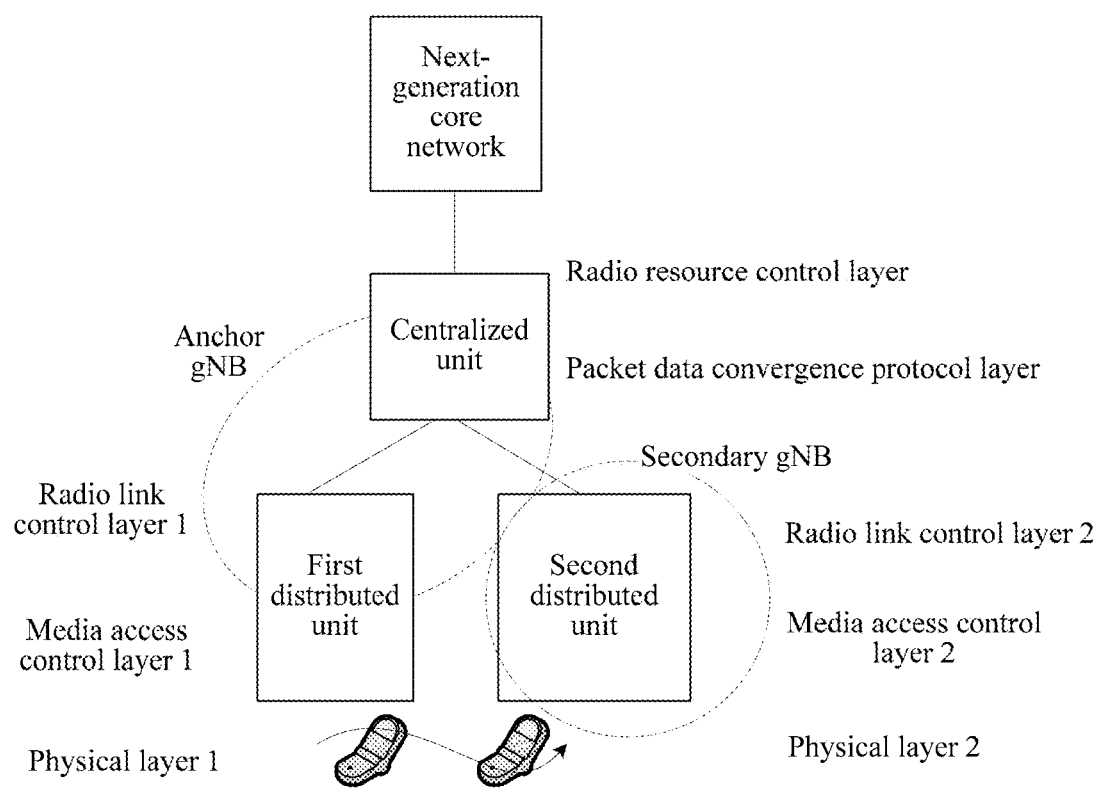
FIG. 8 is a schematic structural diagram of a communications system according to another embodiment of the present invention.

FIG. 8 is a schematic structural diagram of a communications system according to another embodiment of the present invention. The communications system is a 5G or next-generation communications system, and includes a next-generation core network (NG Core), a centralized unit (CU), a first distributed unit (first DU), and a second distributed unit (second DU). The CU communicates with the first DU and the second DU in a wired or wireless manner. The first DU and the second DU communicate with a terminal device through air interfaces. The terminal device moves between different DUs, for example, moves from the first DU to the second DU. An RRC-layer function and a PDCP-layer function are located on the CU. An RLC-layer function, a MAC-layer function, and a PHY-layer function are located on the DUs. For example, the first DU has an RLC1 layer, a MAC1 layer, and a PHY1 layer, and the second DU has an RLC2 layer, a MAC2 layer, and a PHY2 layer.

Before a primary cell change, the CU sends a PDCP PDU to the RLC1 layer of the first DU through a PDCP layer, and communicates with the terminal device through MAC1 and PHY1 of the first DU. For example, data delivered by the CU is processed through the PDCP layer of the CU and then is changed into a PDCP PDU; the PDCP PDU is sent to the RLC1 layer of the first DU, is processed through the RLC1 layer, and then is changed into an RLC PDU; the RLC PDU is processed through the MAC1 layer of the first DU and then is changed into a MAC PDU; and the MAC PDU is processed through the PHY1 layer, then is sent to the terminal device, and then is processed sequentially through a PHY layer, a MAC layer, an RLC layer, and a PDCP layer of the terminal device. For example, data (Data) sent by the terminal device is sent to the PHY1 layer of the first DU, is processed through the PHY1 layer, then is sent to the MAC1 layer of the first DU for processing, and is changed into a MAC SDU; the MAC SDU is processed through the RLC1 layer of the first DU and then is changed into an RLC SDU; and then the RLC SDU is sent to the PDCP layer of the CU.

In another embodiment of the present invention, for a scenario in FIG. 8, 0-ms interruption in a handover process may be implemented through a process of configuring a DC mode for the terminal device in advance and then performing a primary cell change (for example, PCell change).

Figure 9A:
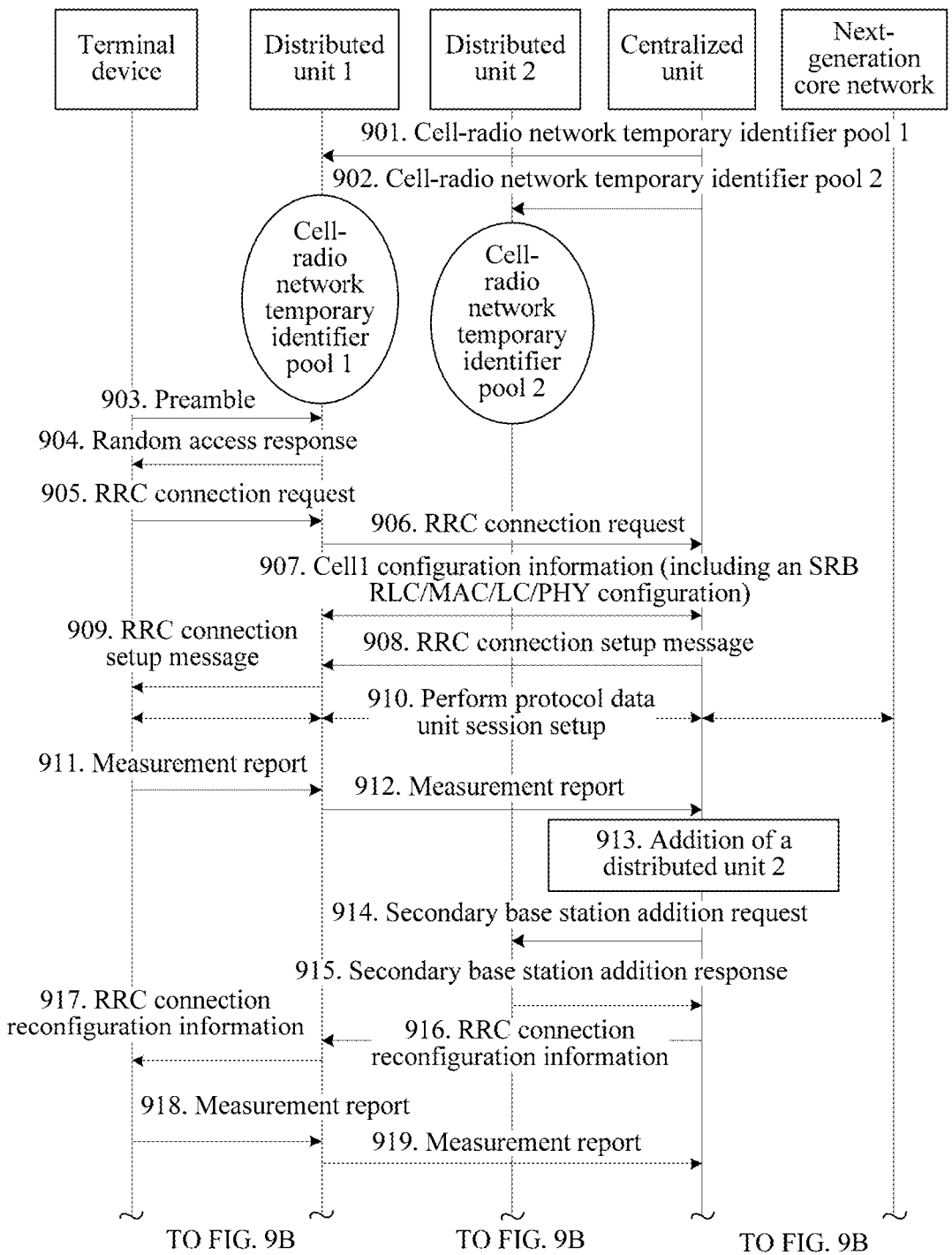
FIG. 9A and FIG. 9B are a schematic flowchart of a mobility management method according to another embodiment of the present invention.
Figure 9B:
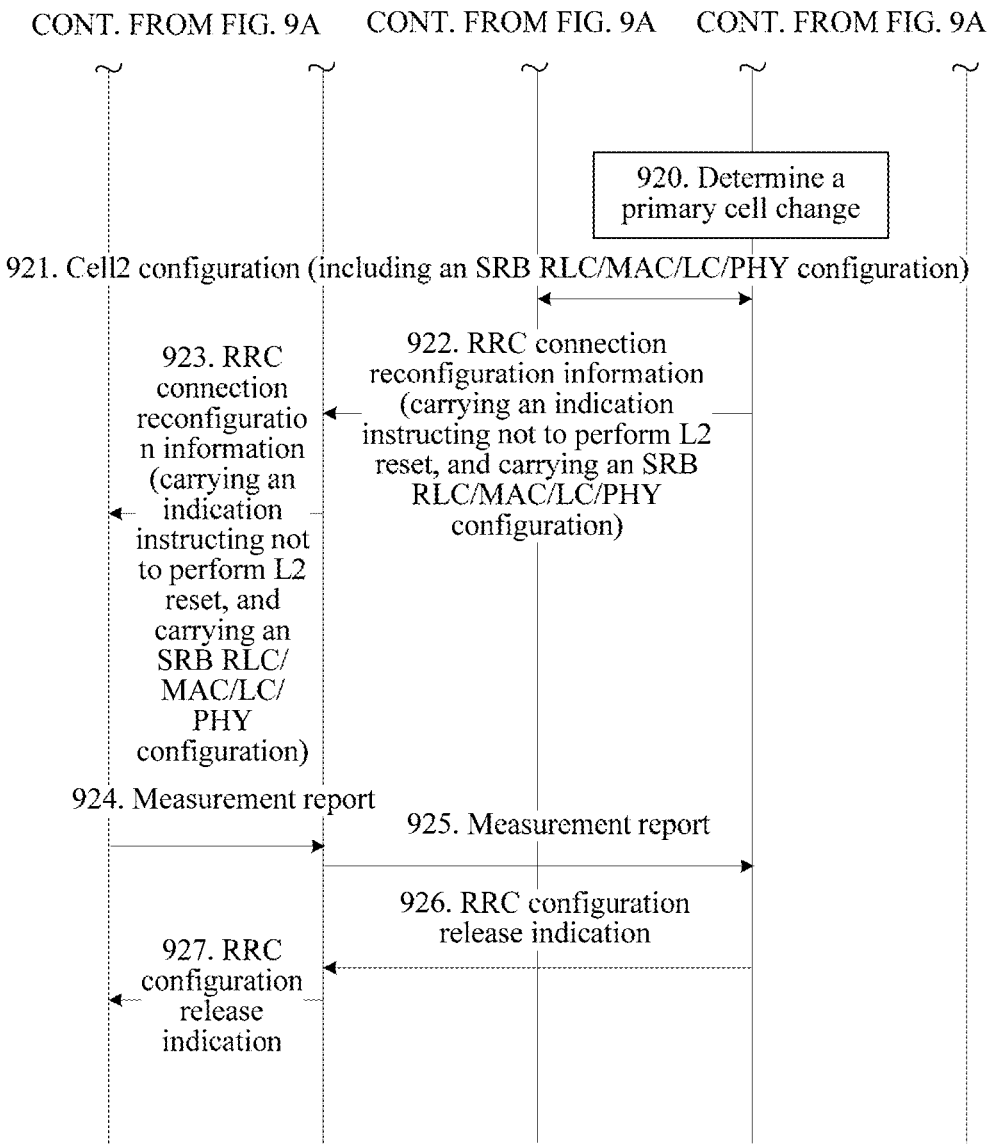

For example, when the terminal device enters coverage of the DU2, the CU configures the DC mode for the terminal device in advance, and configures CU+DU1 as an anchor base station (M-gNB) and the DU2 as a secondary base station (S-gNB) for the terminal device. When signal quality of the DU2 is higher than signal quality of the DU1, a primary cell change (role change) process is performed, CU+DU2 is changed into an M-gNB, and the DU1 is changed into an S-gNB. For a control plane, the terminal device needs to configure an RRC connection for the DU2. For a user plane, reconfiguration does not need to be performed. FIG. 9A and FIG. 9B are a schematic flowchart of a mobility management method according to another embodiment of the present invention.

Step 901. The CU sends a first cell-radio network temporary identifier (cell-radio Network Temporary Identifier, C-RNTI) pool (that is, a C-RNTI pool 1) to the DU1.

The C-RNTI pool 1 includes at least one C-RNTI, and C-RNTIs are different from each other.

Step 902. The CU sends a second C-RNTI pool (that is, a C-RNTI pool 2) to the DU2.

The C-RNTI pool 2 includes at least one C-RNTI, and C-RNTIs are different from each other.

For example, the CU has N C-RNTIs in total, where N is an integer greater than or equal to 2. The N C-RNTIs are divided into two parts, one part is used as the C-RNTI pool 1 and sent to the DU1, and the other part is used as the C-RNTI pool 2 and sent to the DU2.

Step 903. The terminal device sends a preamble (Preamble) to the DU1.

Step 904. The terminal device receives a random access response (Random Access Response, RAR) sent by the DU1.

Step 905. The terminal device sends an RRC connection request (RRC Connection Request) to the DU1.

Step 906. The DU1 sends the RRC connection request to the CU.

The RRC connection request carries a cell identifier, that is, a cell1 ID.

Step 907. The CU sends cell1 air interface resource configuration (cell1 config) information of the DU1 to the DU1.

The cell1 air interface resource configuration information includes an SRB configuration of a cell1.

Step 908. The CU sends an RRC connection setup (RRC connection setup) message to the DU1.

Step 909. The DU1 sends the RRC connection setup message to the terminal device.

Step 910. The UE performs PDU session setup (PDU session setup) with the core network (NG Core) through the DU1 and the CU.

Step 911. The terminal device sends a measurement report (measurement report) to the DU1.

For example, the measurement report carries information about signal quality that is of cells administered by the DU1 and the DU2 and that is measured by the terminal device, for example, RSRP or RSRQ, such as RSRP or RSRQ of the cell1 and a cell2.

Step 912. The DU1 sends the measurement report to the CU.

Step 913. The CU determines to perform DU2 addition (DU2 addition).

The CU determines, based on the measurement report reported by the terminal device, that signal quality of the cell2 (that is, a target cell) administered by the DU2 reaches a particular threshold, and selects the DU2 as the secondary base station. To be specific, the cell1 and the cell2 are both used by the terminal device to perform a dual connectivity (DC) operation.

Step 914. The CU sends a secondary base station addition request (SeNB addition request) to the DU2.

Step 915. The DU2 sends a secondary base station addition response (SeNB addition response) to the CU.

Step 916. The CU sends RRC connection reconfiguration (RRC connection reconfiguration) information to the DU1.

For example, the RRC connection reconfiguration information carries configuration information of the cell2.

Step 917. The DU1 sends the RRC connection reconfiguration information to the terminal device.

For example, the RRC connection reconfiguration information carries the configuration information of the cell2.

Step 918. The terminal device sends a measurement report to the DU1.

For example, the measurement report includes information about signal quality that is of the cell1 and the cell2 and that is measured by the terminal device.

Step 919. The DU1 sends the measurement report to the CU.

The measurement report includes the information about the signal quality of the cell1 and the cell2.

Step 920. The DU1 determines a primary cell change (Role change decision).

For example, when the CU determines, based on the measurement report sent by the terminal device, that signal quality of the cell2 served by the DU2 is higher than signal quality of the cell1 served by the DU1, it is determined that a primary cell change needs to be performed, CU+DU2 is changed into an M-gNB, and the DU1 is changed into an S-gNB.

Step 921. The CU sends, to the DU2, air interface resource configuration information of the cell2 of the DU2.

For example, the CU performs an air interface resource configuration for the cell2 of the DU2, and sends the air interface resource configuration information of the cell2 to the DU2. The air interface resource configuration information of the cell2 includes an SRB configuration.

Step 922. The CU sends RRC connection reconfiguration (RRC connection Reconfiguration) information to the DU1.

The RRC connection reconfiguration information carries an indication instructing not to perform L2 reset, and carries the SRB configuration of the cell2.

Step 923. The DU1 sends the RRC connection reconfiguration information to the terminal device.

The RRC connection reconfiguration information carries the indication instructing not to perform L2 reset, and carries the SRB configuration of the cell2. Therefore, the terminal device does not perform L2 reset, and the terminal device needs to perform an RRC connection configuration for the cell2 of the DU2.

Step 924. The terminal device sends a measurement report to the DU1.

Step 925. The DU1 sends the measurement report to the CU.

Step 926. The CU sends an RRC configuration release indication to the DU1.

Step 927. The DU1 sends the RRC configuration release indication to the terminal device.

The terminal device releases an RRC connection to the DU1 based on the RRC configuration release indication.

In the foregoing embodiment, when the terminal device is moving, a link between the terminal device and the DU2 is established in advance, and L2 reset is not performed, thereby ensuring 0-ms interruption during handover.

Figure 10:
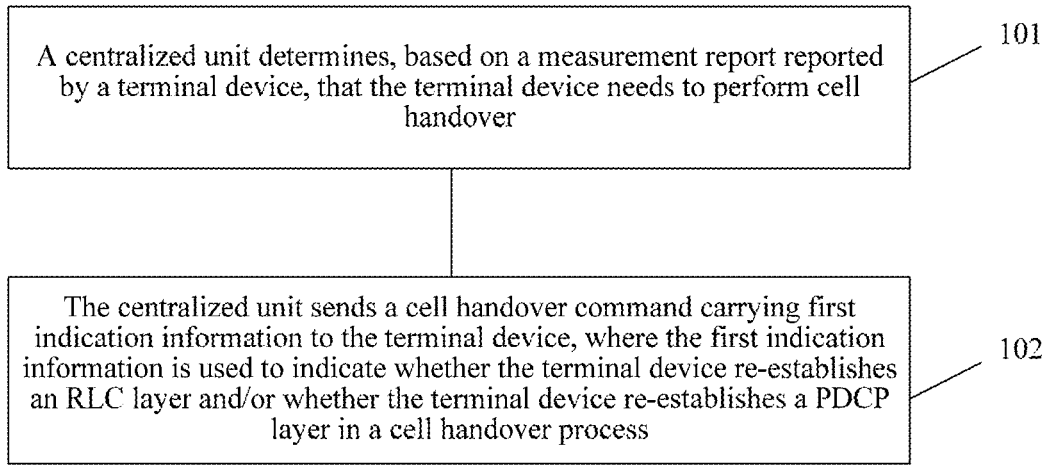
FIG. 10 is a schematic flowchart of a mobility management method according to another embodiment of the present invention.

FIG. 10 is a schematic flowchart of a mobility management method according to another embodiment of the present invention. A base station system includes a centralized unit and at least one distributed unit. The centralized unit communicates with the at least one distributed unit in a wired or wireless manner. The at least one distributed unit communicates with a terminal device through an air interface. The centralized unit may be a CU in a 5G NR system.

Step 101. The centralized unit determines, based on a measurement report reported by the terminal device, that the terminal device needs to perform cell handover.

For example, the terminal device is located in a source cell, and measures signal quality of each cell found by the terminal device through scanning, and the measurement report carries information about the signal quality that is of each cell and that is measured by the terminal device, for example, RSRP or RSRQ. When the centralized unit determines, based on the measurement report, that a cell whose signal quality reaches a particular threshold or a cell having best signal quality is a target cell, it is determined that cell handover needs to be performed.

Step 102. The centralized unit sends a cell handover command carrying first indication information to the terminal device, where the first indication information is used to indicate whether the terminal device re-establishes an RLC layer and/or whether the terminal device re-establishes a PDCP layer in a cell handover process.

In another embodiment of the present invention, when the terminal device performs cell handover between different cells administered by a same distributed unit and does not perform a key update, the first indication information is used to indicate that the terminal device does not need to re-establish the RLC layer and does not need to re-establish the PDCP layer in the cell handover process.

In another embodiment of the present invention, the centralized unit further notifies the first distributed unit of whether to re-establish the RLC layer. For example, when the terminal device performs cell handover between different cells administered by a same distributed unit and does not perform a key update, the centralized unit further sends second indication information to the distributed unit, where the second indication information is used to indicate that the distributed unit does not need to re-establish the RLC layer.

In another embodiment of the present invention, when the terminal device performs cell handover between different cells administered by a same distributed unit and performs a key update, the first indication information is used to indicate that the terminal device needs to re-establish the RLC layer and needs to re-establish the PDCP layer in the cell handover process.

In another embodiment of the present invention, an implicit indication may be performed. For example, when the terminal device performs cell handover between different cells administered by a same distributed unit and performs a key update, the first indication information is a parameter related to a key update, and the parameter is used to instruct the terminal device to perform a key update, and implicitly indicate that the terminal device needs to re-establish the RLC layer and re-establish the PDCP layer in the cell handover process.

In another embodiment of the present invention, the centralized unit further sends third indication information to the distributed unit, where the third indication information includes an identifier used to indicate a target cell to which the terminal device performs cell handover, and air interface resource configuration information corresponding to the target cell.

In another embodiment of the present invention, when the terminal device performs cell handover between cells administered by different distributed units and does not perform a key update, the first indication information is used to indicate that the terminal device does not need to reset a MAC layer, does not need to re-establish the RLC layer, and does not need to re-establish the PDCP layer in the cell handover process.

Figure 11:
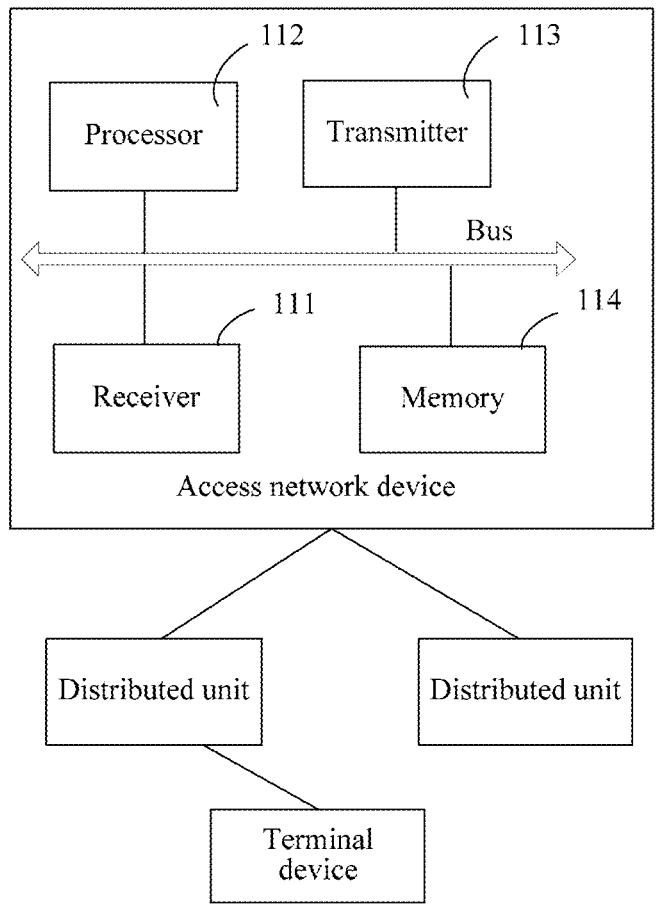
FIG. 11 is a schematic structural diagram of a communications system according to another embodiment of the present invention.

FIG. 11 is a schematic structural diagram of a communications system according to an embodiment of the present invention. The communications system includes an access network device and at least one distributed unit. The access network device communicates with the at least one distributed unit in a wired or wireless manner. The at least one distributed unit communicates with a terminal device through an air interface. The access network device may be a CU in a 5G NR system. The access network device includes: a receiver 111, a processor 112, a transmitter 113, and a memory 114. The receiver 111, the processor 112, the transmitter 113, and the memory 114 communicate with each other through a bus.

In this embodiment of this application, the processor 112 may be an EPLD, an FPGA, a DSP chip, an ASIC or another programmable logic device, a discrete gate or transistor logic device, a discrete hardware component, or the like.

The memory 114 is configured to store code or instruction information, and may further store information about a device type. The memory 114 may include a ROM and a RAM, and is configured to provide an instruction and data for the processor 112. A part of the memory 114 may further include a non-volatile random access memory.

The receiver 111 is configured to receive a measurement report reported by the terminal device.

For example, the terminal device is located in a source cell, and measures signal quality of each cell found by the terminal device through scanning, and the measurement report carries information about the signal quality of each cell found by the terminal device through scanning, for example, RSRP or RSRQ.

The processor 112 is configured to determine, based on the measurement report reported by the terminal device, that the terminal device needs to perform cell handover.

When the centralized unit determines, based on the measurement report, that a cell whose signal quality reaches a particular threshold or a cell having best signal quality is a target cell, it is determined that cell handover needs to be performed.

The transmitter 113 is configured to send a cell handover command carrying first indication information to the terminal device, where the first indication information is used to indicate whether the terminal device re-establishes an RLC layer and/or whether the terminal device re-establishes a PDCP layer in a cell handover process.

In another embodiment of the present invention, when the terminal device performs cell handover between different cells administered by a same distributed unit and does not perform a key update, the first indication information is used to indicate that the terminal device does not need to re-establish the RLC layer and does not need to re-establish the PDCP layer in the cell handover process.

In another embodiment of the present invention, the transmitter 113 is further configured to notify the first distributed unit of whether to re-establish the RLC layer. For example, when the terminal device performs cell handover between different cells administered by a same distributed unit and does not perform a key update, the transmitter 113 sends second indication information to the distributed unit, where the second indication information is used to indicate that the distributed unit does not need to re-establish the RLC layer.

In another embodiment of the present invention, when the terminal device performs cell handover between different cells administered by a same distributed unit and performs a key update, the first indication information is used to indicate that the terminal device needs to re-establish the RLC layer and needs to re-establish the PDCP layer in the cell handover process.

In another embodiment of the present invention, an implicit indication may be performed. For example, when the terminal device performs cell handover between different cells administered by a same distributed unit and performs a key update, the first indication information is a parameter related to a key update, and the parameter is used to instruct the terminal device to perform a key update, and implicitly indicate that the terminal device needs to re-establish the RLC layer and re-establish the PDCP layer in the cell handover process.

In another embodiment of the present invention, the transmitter 113 further sends third indication information to the distributed unit, where the third indication information includes an identifier used to indicate a target cell to which the terminal device performs cell handover, and air interface resource configuration information corresponding to the target cell.

In another embodiment of the present invention, when the terminal device performs cell handover between cells administered by different distributed units and does not perform a key update, the first indication information is used to indicate that the terminal device does not need to reset a MAC layer, does not need to re-establish the RLC layer, and does not need to re-establish the PDCP layer in the cell handover process.

Figure 12:
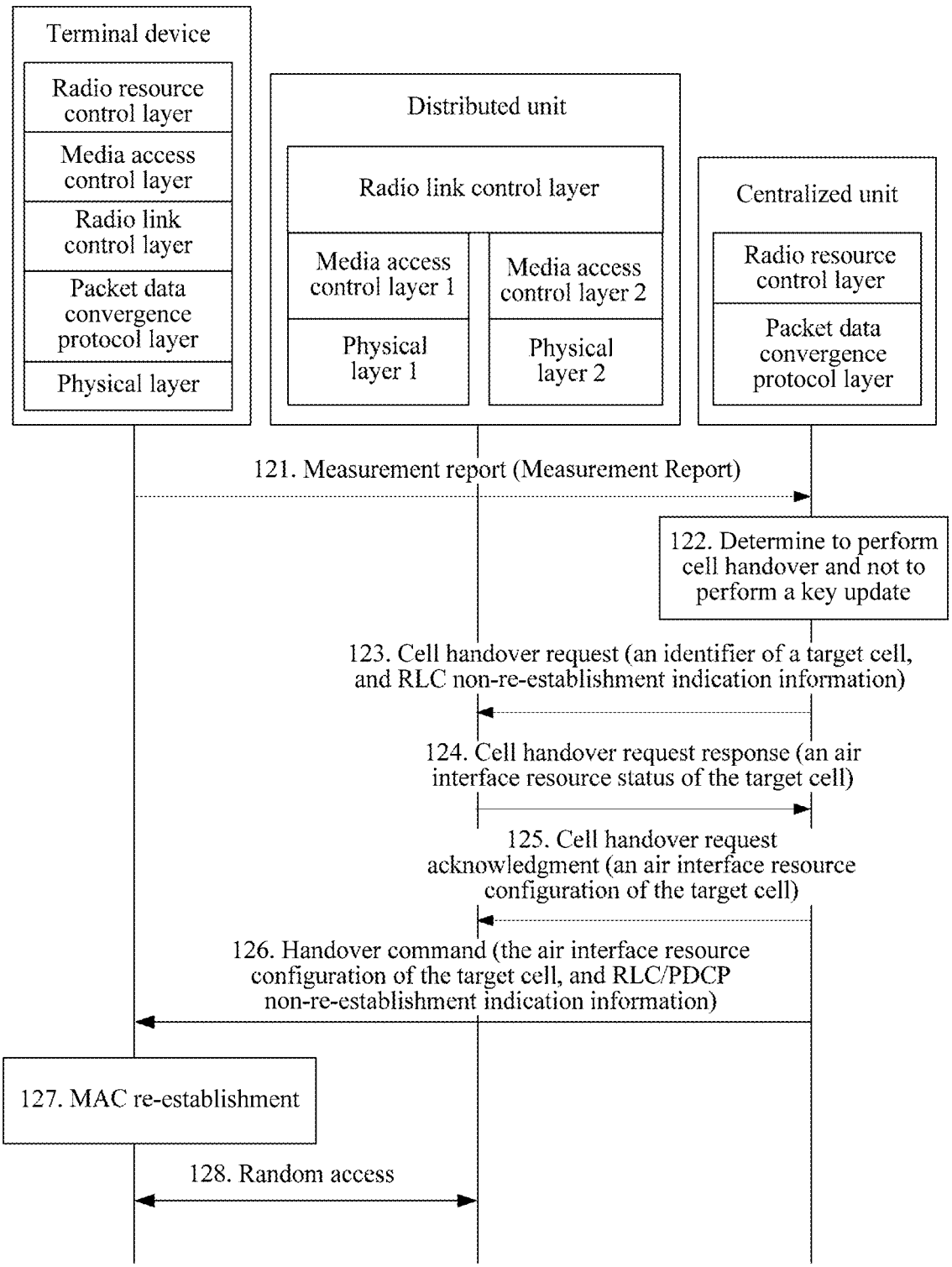
FIG. 12 is a schematic flowchart of a mobility management method according to another embodiment of the present invention.

For the scenario in FIG. 6, another embodiment of the present invention provides another mobility management method. FIG. 12 is a schematic flowchart of a mobility management method according to another embodiment of the present invention.

Before handover, the CU sends a PDCP PDU to an RLC layer of the DU through a PDCP layer, and communicates with the terminal device through MAC1 and PHY1 of the cell1 served by the DU. For example, data delivered by the CU is processed through the PDCP layer of the CU and then is changed into a PDCP PDU; the PDCP PDU is sent to the RLC layer of the DU, is processed through the RLC layer, and then is changed into an RLC PDU; the RLC PDU is processed through the MAC1 layer of the DU and then is changed into a MAC PDU; and the MAC PDU is processed through the PHY1 layer, then is sent to the terminal device, and then is processed sequentially through a PHY layer, a MAC layer, an RLC layer, and a PDCP layer of the terminal device. For example, data (Data) sent by the terminal device is sent to the PHY1 layer of the DU, is processed through the PHY1 layer, then is sent to the MAC1 layer of the DU for processing, and is changed into a MAC SDU; the MAC SDU is processed through the RLC layer of the DU and then is changed into an RLC SDU; and then the RLC SDU is sent to the PDCP layer of the CU.

Step 121. The terminal device sends a measurement report (Measurement Report) to the CU.

For example, a source cell cell1 and a target cell cell2 have an overlapping area. When the terminal device enters coverage of the target cell cell2, the terminal device sends a measurement report to the CU through the DU, where the measurement report carries signal quality of the source cell cell1 and the target cell cell2, for example, signal strength such as RSRP or RSRQ.

In another embodiment of the present invention, the terminal device may send, for the source cell cell1 and the target cell cell2, measurement reports carrying respective cell signal quality to the CU. For example, the terminal device sends a measurement report carrying signal quality of the source cell cell1 to the CU, and the terminal device sends a measurement report carrying signal quality of the target cell cell2 to the CU.

Step 122. The CU determines to perform cell handover and not to perform a key update.

For example, when the CU determines, based on the measurement report of the terminal device, that the signal quality of the target cell cell2 is higher than the signal quality of the source cell cell1, it is determined that the terminal device needs to perform cell handover.

Further, the CU determines not to perform a key update.

Step 123. The CU sends a cell handover request to the DU.

For example, the cell handover request carries an identifier of the target cell cell2 and RLC layer non-re-establishment indication information. For example, the identifier of the target cell cell2 may be a C-RNTI of the target cell cell2, and the RLC layer non-re-establishment indication information is used to indicate that the DU does not need to re-establish the RLC layer in a cell handover process.

Step 124. The DU sends a cell handover request response to the CU.

The cell handover request response carries an air interface resource status of the target cell cell2, for example, a configuration of the MAC layer and a configuration of the PHY layer.

Step 125. The CU sends a cell handover request acknowledgment to the DU.

The cell handover request acknowledgment carries an air interface resource configuration of the target cell cell2, for example, an SRB configuration and a DRB configuration.

Step 126. The CU sends a handover command (handover command) to the terminal device through the DU.

In another embodiment of the present invention, the handover command carries an air interface resource configuration of the target cell cell2 and non-re-establishment indication information, and the non-re-establishment indication information is used to indicate that the terminal device does not need to re-establish the RLC layer and/or re-establish the PDCP layer in the handover process.

In another embodiment of the present invention, the handover control command carries an air interface resource configuration of the target cell cell2 and carries first indication information and/or second indication information. The first indication information is used to indicate that the terminal device does not need to re-establish the RLC layer of the terminal device in the handover process. The second indication information is used to indicate that the terminal device does not need to re-establish the PDCP layer of the terminal device in the handover process.

Step 127. The terminal device resets the MAC layer (MAC reset).

Step 128. The terminal device initiates a random access process in the target cell cell2.

After the terminal device completes handover from the cell1 to the cell2, the terminal device initiates random access (RACH) in the target cell cell2, and a random access request sent by the terminal device arrives at a PHY2 layer of the DU, and is processed sequentially through a MAC2 layer and the RLC layer of the DU and then sent to the PDCP layer of the CU. After the random access is completed, the terminal device communicates with the DU through the RLC layer, the MAC2 layer, and the PHY2 layer of the DU, and the DU communicates with the CU through the RLC layer, the MAC2 layer, and the PHY2 layer of the DU and the PDCP layer of the CU.

In this embodiment, when the terminal device moves between different cells served by the DU, when it is determined that no key update needs to be performed, the CU indicates that the terminal device does not need to trigger re-establishment of the RLC layer and the PDCP layer, and needs only to perform MAC reset. Therefore, a handover delay is shortened.

Figure 13:
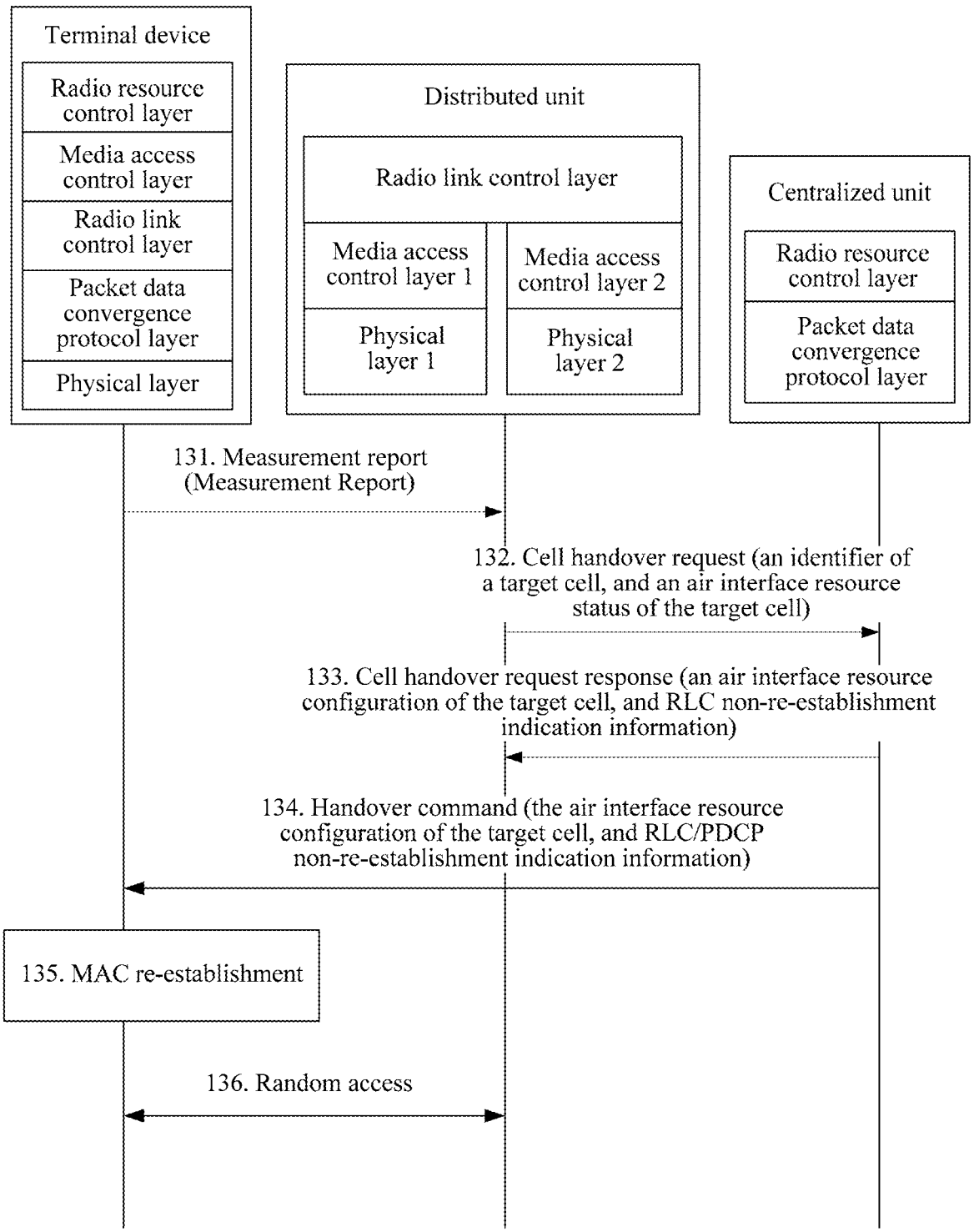
FIG. 13 is a schematic flowchart of a mobility management method according to another embodiment of the present invention.

For the scenario in FIG. 6, another embodiment of the present invention provides another mobility management method. FIG. 13 is a schematic flowchart of a mobility management method according to another embodiment of the present invention.

Before handover, the CU sends a PDCP PDU to an RLC layer of the DU through a PDCP layer, and communicates with the terminal device through MAC1 and PHY1 of the cell1 served by the DU. For example, data delivered by the CU is processed through the PDCP layer of the CU and then is changed into a PDCP PDU; the PDCP PDU is sent to the RLC layer of the DU, is processed through the RLC layer, and then is changed into an RLC PDU; the RLC PDU is processed through the MAC1 layer of the DU and then is changed into a MAC PDU; and the MAC PDU is processed through the PHY1 layer, then is sent to the terminal device, and then is processed sequentially through a PHY layer, a MAC layer, an RLC layer, and a PDCP layer of the terminal device. For example, data (Data) sent by the terminal device is sent to the PHY1 layer of the DU, is processed through the PHY1 layer, and then is changed into a PHY SDU; the PHY SDU is sent to the MAC1 layer of the DU for processing, and is changed into a MAC SDU; the MAC SDU is processed through the RLC layer of the DU and then is changed into an RLC SDU; and then the RLC SDU is sent to the PDCP layer of the CU.

Step 131. The DU receives a measurement result sent by the terminal device and determines to perform cell handover.

For example, a source cell cell1 and a target cell cell2 have an overlapping area. When the terminal device enters coverage of the target cell cell2, the DU measures a UL signal sent by the terminal device. When it is found that signal quality, for example, signal strength such as RSRP or RSRQ, of the source cell cell1 is higher than signal quality of the target cell cell2, it is determined that the terminal device needs to perform cell handover.

Step 132. The DU sends a cell handover request to the CU.

For example, the cell handover request carries an identifier of the target cell cell2 and an air interface resource status of the target cell cell2. For example, the identifier of the target cell cell2 is an ECGI or a PCI of the target cell cell2, and the air interface resource status of the target cell cell2 is configurations of the MAC layer and the PHY layer corresponding to the cell2.

The CU determines not to perform a key update.

Step 133. The CU sends a cell handover request response to the DU.

The cell handover request response carries an air interface resource configuration of the target cell cell2 and an RLC layer non-re-establishment indication. The RLC layer non-re-establishment indication is used to indicate, to the DU, that the terminal device does not need to re-establish the RLC layer in a handover process.

Step 134. The CU sends a handover command (handover command) to the terminal device through the DU.

In another embodiment of the present invention, the handover command carries an air interface resource configuration of the target cell cell2 and non-re-establishment indication information. The non-re-establishment indication information is used to indicate that the terminal device does not need to re-establish the RLC layer and/or re-establish the PDCP layer in the handover process.

In another embodiment of the present invention, the handover control command carries an air interface resource configuration of the target cell cell2 and carries first indication information and/or second indication information. The first indication information is used to indicate that the terminal device does not need to re-establish the RLC layer of the terminal device in the handover process. The second indication information is used to indicate that the terminal device does not need to re-establish the PDCP layer of the terminal device in the handover process.

Step 135. The terminal device resets the MAC layer (MAC reset).

Step 136. The terminal device initiates a random access process in the target cell cell2.

After the terminal device completes handover from the cell1 to the cell2, the terminal device initiates random access (RACH) in the target cell cell2, and a random access request sent by the terminal device arrives at a PHY2 layer of the DU, and is processed sequentially through a MAC2 layer and the RLC layer of the DU and then sent to the PDCP layer of the CU. After the random access is completed, the terminal device communicates with the DU through the RLC layer, the MAC2 layer, and the PHY2 layer of the DU, and the DU communicates with the CU through the RLC layer, the MAC2 layer, and the PHY2 layer of the DU and the PDCP layer of the CU.

In this embodiment, when the terminal device moves between different cells served by the DU, when it is determined that no key update needs to be performed, the CU indicates that the terminal device does not need to trigger re-establishment of the RLC layer and the PDCP layer, and needs only to perform MAC reset. Therefore, a handover delay is shortened.

Figure 14:
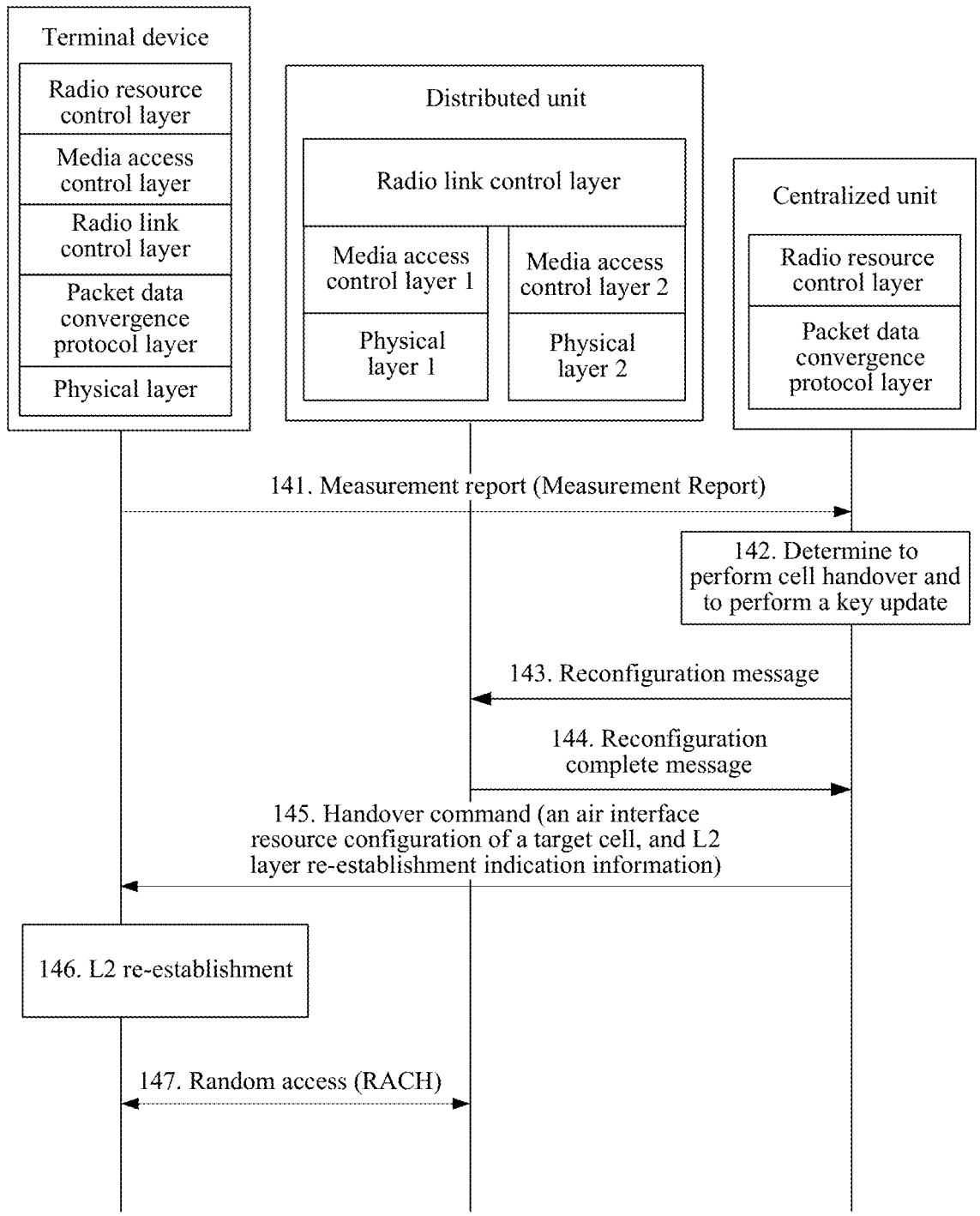
FIG. 14 is a schematic flowchart of a mobility management method according to another embodiment of the present invention.

For the scenario in FIG. 6, another embodiment of the present invention provides another mobility management method. FIG. 14 is a schematic flowchart of a mobility management method according to another embodiment of the present invention.

Before handover, the CU sends a PDCP PDU to an RLC layer of the DU through a PDCP layer, and communicates with the terminal device through MAC1 and PHY1 of the cell1 served by the DU. For example, data delivered by the CU is processed through the PDCP layer of the CU and then is changed into a PDCP PDU; the PDCP PDU is sent to the RLC layer of the DU, is processed through the RLC layer, and then is changed into an RLC PDU; the RLC PDU is processed through the MAC1 layer of the DU and then is changed into a MAC PDU; and the MAC PDU is processed through the PHY1 layer, then is sent to the terminal device, and then is processed sequentially through a PHY layer, a MAC layer, an RLC layer, and a PDCP layer of the terminal device. For example, data (Data) sent by the terminal device is sent to the PHY1 layer of the DU, is processed through the PHY1 layer, and then is changed into a PHY SDU; the PHY SDU is sent to the MAC1 layer of the DU for processing, and is changed into a MAC SDU; the MAC SDU is processed through the RLC layer of the DU and then is changed into an RLC SDU; and then the RLC SDU is sent to the PDCP layer of the CU.

Step 141. The terminal device sends a measurement report (Measurement Report) to the CU.

For example, a source cell cell1 and a target cell cell2 have an overlapping area. When the terminal device enters coverage of the target cell cell2, the terminal device sends a measurement report to the CU through the DU, where the measurement report carries signal quality of the source cell cell1 and the target cell cell2, for example, signal strength such as RSRP or RSRQ.

In another embodiment of the present invention, the terminal device may send, for the source cell cell1 and the target cell cell2, measurement reports carrying respective cell signal quality to the CU. For example, the terminal device sends a measurement report carrying signal quality of the source cell cell1 to the CU, and the terminal device sends a measurement report carrying signal quality of the target cell cell2 to the CU.

Step 142. The CU determines to perform cell handover and determines that a key update needs to be performed.

For example, when the CU determines, based on the measurement report of the terminal device, that the signal quality of the target cell cell2 is higher than the signal quality of the source cell cell1, it is determined that the terminal device needs to perform cell handover.

Further, the CU determines to perform a key update.

Step 143. The CU sends reconfiguration information to the DU.

For example, the reconfiguration information carries an identifier of the target cell cell2. For example, the identifier of the target cell cell2 is an E-UTRAN cell global identifier (E-UTRAN Cell Global Identifier, ECGI) or a physical-layer cell identity (physical-layer Cell identity, PCI) of the target cell cell2.

Step 144. The DU sends a reconfiguration complete message to the CU.

The reconfiguration complete message carries an air interface resource status of the target cell cell2.

Step 145. The CU sends a handover command (handover command) to the terminal device through the DU.

In another embodiment of the present invention, the handover command carries an air interface resource configuration of the target cell cell2 and L2 layer re-establishment indication information. The L2 layer re-establishment indication information is used to indicate that the terminal device needs to perform L2 layer re-establishment in a handover process, for example, re-establish the RLC layer, re-establish the PDCP layer, and reset the MAC layer.

Step 146. The terminal device performs L2 layer re-establishment.

For example, the terminal device re-establishes the RLC layer, re-establishes the PDCP layer, and resets the MAC layer.

Step 147. The terminal device initiates a random access process in the target cell cell2.

After the terminal device completes handover from the cell1 to the cell2, the terminal device initiates random access (RACH) in the target cell cell2, and a random access request sent by the terminal device arrives at a PHY2 layer of the DU, and is processed sequentially through a MAC2 layer and the RLC layer of the DU and then sent to the PDCP layer of the CU. After the random access is completed, the terminal device communicates with the DU through the RLC layer, the MAC2 layer, and the PHY2 layer of the DU, and the DU communicates with the CU through the RLC layer, the MAC2 layer, and the PHY2 layer of the DU and the PDCP layer of the CU.

In this embodiment, when the terminal device moves between different cells served by the DU, when it is determined that a key update needs to be performed, the CU indicates that the terminal device needs to trigger re-establishment of the MAC layer, the RLC layer, and the PDCP layer.

Figure 15:
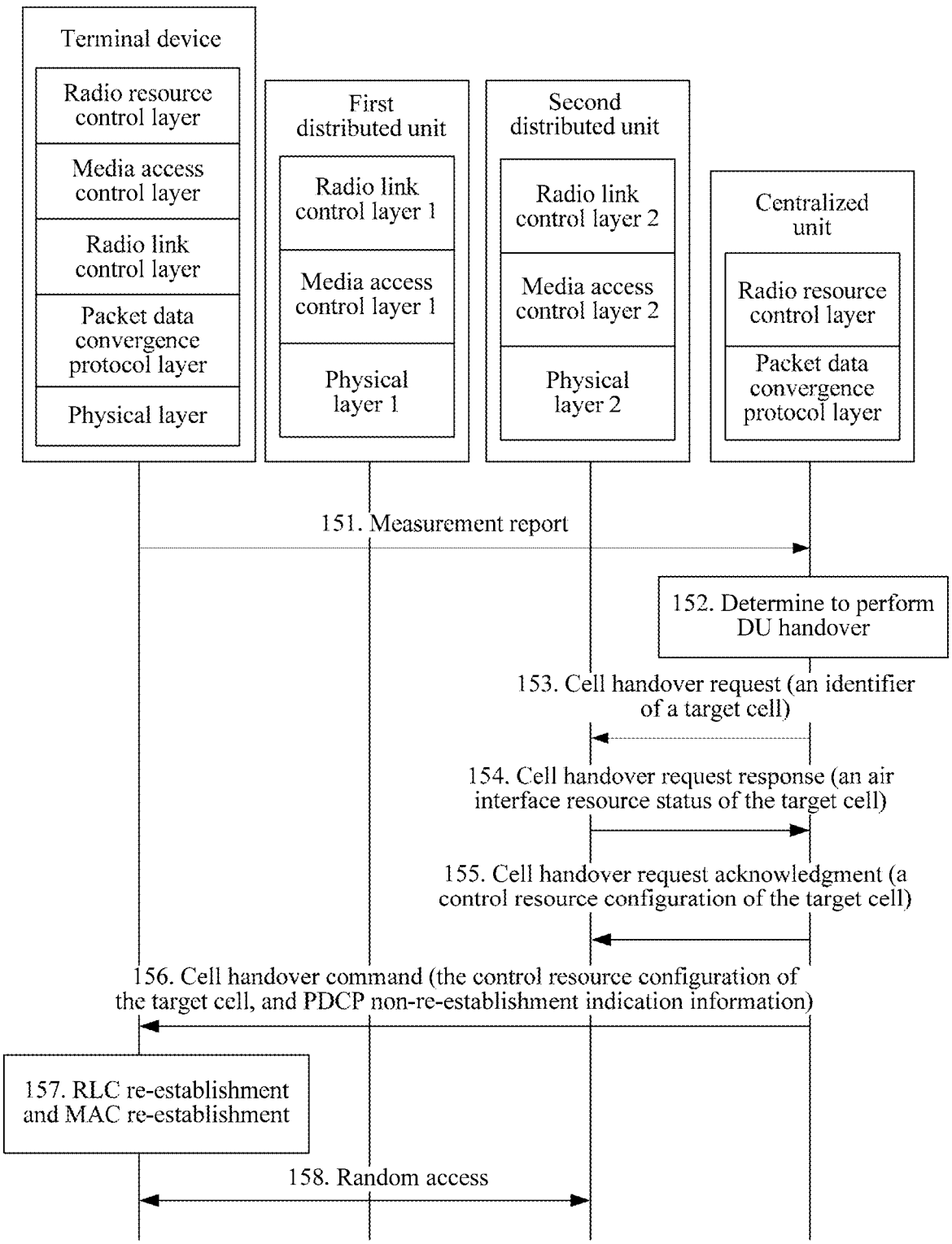
FIG. 15 is a schematic flowchart of a mobility management method according to another embodiment of the present invention.

For the scenario in FIG. 8, another embodiment of the present invention provides another mobility management method. FIG. 15 is a schematic flowchart of a mobility management method according to another embodiment of the present invention.

Before handover, the CU sends a PDCP PDU to an RLC layer of the first DU through a PDCP layer, and communicates with the terminal device through MAC1 and PHY1 of the first DU. For example, data delivered by the CU is processed through the PDCP layer of the CU and then is changed into a PDCP PDU; the PDCP PDU is sent to the RLC1 layer of the first DU, is processed through the RLC1 layer, and then is changed into an RLC PDU; the RLC PDU is processed through the MAC1 layer of the first DU and then is changed into a MAC PDU; and the MAC PDU is processed through the PHY1 layer, then is sent to the terminal device, and then is processed sequentially through a PHY layer, a MAC layer, an RLC layer, and a PDCP layer of the terminal device. For example, data (Data) sent by the terminal device is sent to the PHY1 layer of the first DU, is processed through the PHY1 layer, then is sent to the MAC1 layer of the first DU for processing, and is changed into a MAC SDU; the MAC SDU is processed through the RLC1 layer of the first DU and then is changed into an RLC SDU; and then the RLC SDU is sent to the PDCP layer of the CU.

Step 151. The terminal device sends a measurement report (Measurement Report) to the CU.

For example, when the terminal device enters a target cell cell2 in coverage of the second DU from a source cell cell1 in coverage of the first DU, the terminal device sends a measurement report to the CU through the first DU, where the measurement report carries signal quality of the source cell cell1 and the target cell cell2, for example, signal strength such as RSRP or RSRQ. In another embodiment of the present invention, the source cell cell1 and the target cell cell2 may have an overlapping area, or may be separated from each other and do not have an overlapping area.

In another embodiment of the present invention, the terminal device may send, for the source cell cell1 and the target cell cell2, measurement reports carrying respective cell signal quality to the CU. For example, the terminal device sends a measurement report carrying signal quality of the source cell cell1 to the CU, and the terminal device sends a measurement report carrying signal quality of the target cell cell2 to the CU.

Step 152. The CU determines to perform DU handover and not to perform a key update.

For example, when the CU determines, based on the measurement report of the terminal device, that the signal quality of the target cell cell2 is higher than the signal quality of the source cell cell1, it is determined that the terminal device needs to perform cell handover, that is, perform DU handover.

Step 153. The CU sends a cell handover request to the second DU.

The cell handover request carries an identifier of the target cell cell2. For example, the identifier of the target cell cell2 is an ECGI or a PCI of the target cell cell2.

Step 154. The second DU sends a cell handover request response to the CU.

The cell handover request response carries an air interface resource status of the target cell cell2.

Step 155. The CU sends a cell handover request acknowledgment to the second DU.

The cell handover request acknowledgment carries an air interface resource configuration of the target cell cell2.

Step 156. The CU sends a handover control command (Handover command) to the terminal device.

The CU sends the handover control command to the terminal device through the first DU. The handover control command carries the air interface resource configuration of the target cell cell2 and PDCP non-re-establishment indication information. The PDCP non-re-establishment indication information is used to notify the terminal device that the PDCP layer of the terminal device does not need to be re-established in a cell handover process.

Therefore, the terminal device re-establishes the RLC layer and performs MAC reset, and a process of re-establishing the PDCP layer may be omitted.

Step 157. The terminal device re-establishes the RLC layer and performs MAC reset.

Step 158. The terminal device initiates random access in the target cell cell2.

After the terminal device completes handover from the cell1 to the cell2, the terminal device initiates random access (RACH) in the target cell cell2, and a random access request sent by the terminal device arrives at a PHY2 layer of the second DU, and is processed sequentially through a MAC2 layer and the RLC layer of the second DU and then sent to the PDCP layer of the CU. After the random access is completed, the terminal device communicates with the second DU through the RLC layer, the MAC2 layer, and the PHY2 layer of the second DU, and the second DU communicates with the CU through the RLC layer, the MAC2 layer, and the PHY2 layer of the second DU and the PDCP layer of the CU.

In this embodiment, when the terminal device moves between different DUs, the CU indicates that the terminal device does not need to trigger re-establishment of the PDCP layer. Therefore, a handover delay is shortened.

Figure 16:
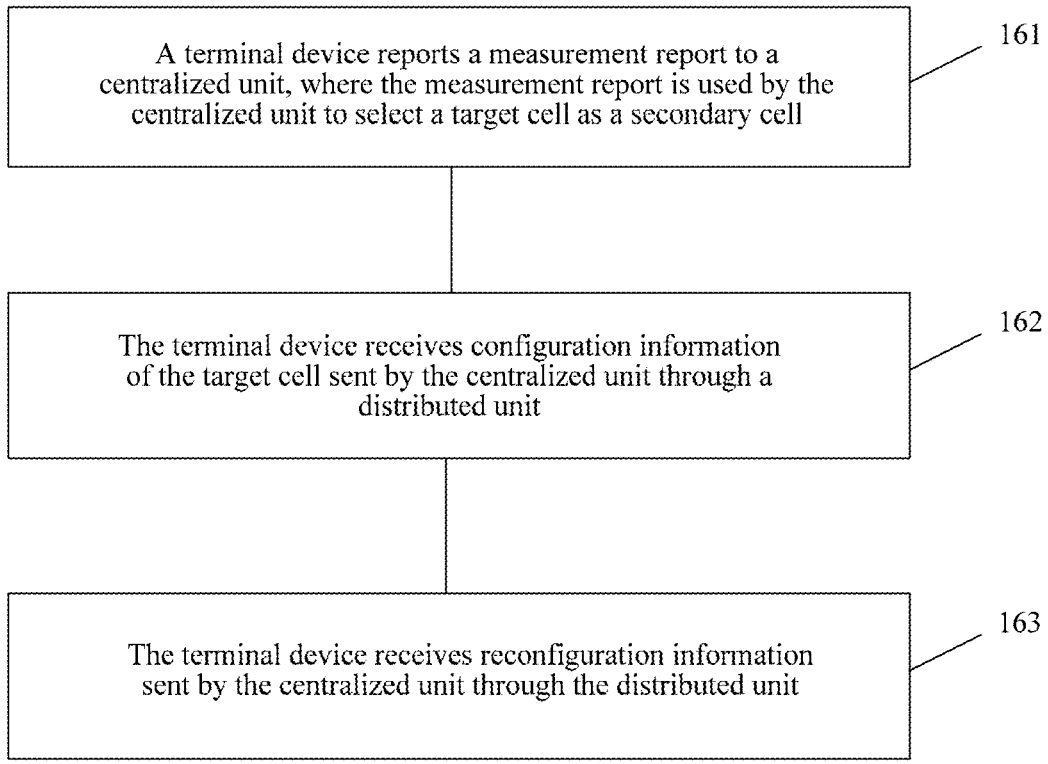
FIG. 16 is a schematic flowchart of a mobility management method according to another embodiment of the present invention.

FIG. 16 is a schematic flowchart of a mobility management method according to another embodiment of the present invention. A base station system includes a centralized unit and a distributed unit. The centralized unit communicates with the distributed unit. The distributed unit communicates with a terminal device through an air interface.

Step 161. The terminal device reports a measurement report to the centralized unit, where the measurement report is used by the centralized unit to select a target cell as a secondary cell.

Step 162. The terminal device receives configuration information of the target cell sent by the centralized unit through the distributed unit.

Step 163. The terminal device receives reconfiguration information sent by the centralized unit through the distributed unit.

The reconfiguration information is generated when air interface resource reconfiguration is performed for the target cell after the centralized unit receives primary cell change indication information sent by the distributed unit.

In another embodiment of the present invention, after the centralized unit sends the configuration information of the target cell to the terminal device through the distributed unit and the centralized unit sends activation indication information to the distributed unit, the terminal device receives a PDCCH activation command sent by the distributed unit and activates the target cell, where the activation indication information is used to instruct the distributed unit to send the PDCCH activation command to the terminal device, and the PDCCH activation command is used to instruct the terminal device to activate the target cell.

In another embodiment of the present invention, after the centralized unit sends the configuration information of the target cell to the terminal device through the distributed unit and before the centralized unit receives activation acknowledgment indication information sent by the distributed unit, the terminal device receives a PDCCH activation command sent by the distributed unit, where the PDCCH activation command is used to instruct the terminal device to activate the target cell, and the activation acknowledgment indication information is used to indicate, to the centralized unit, that the target cell has been activated.

In another embodiment of the present invention, the terminal device further receives first indication information sent by the centralized unit through the distributed unit, where the first indication information is used to indicate that the terminal device does not need to re-establish an RLC layer and/or does not need to re-establish a PDCP layer in a primary cell change process.

In another embodiment of the present invention, the centralized unit sends second indication information to the distributed unit, where the second indication information is used to indicate that the distributed unit does not need to re-establish an RLC layer.

In another embodiment of the present invention, the reconfiguration information includes at least one of the following: an SRB configuration and a PUCCH configuration.

Figure 17:
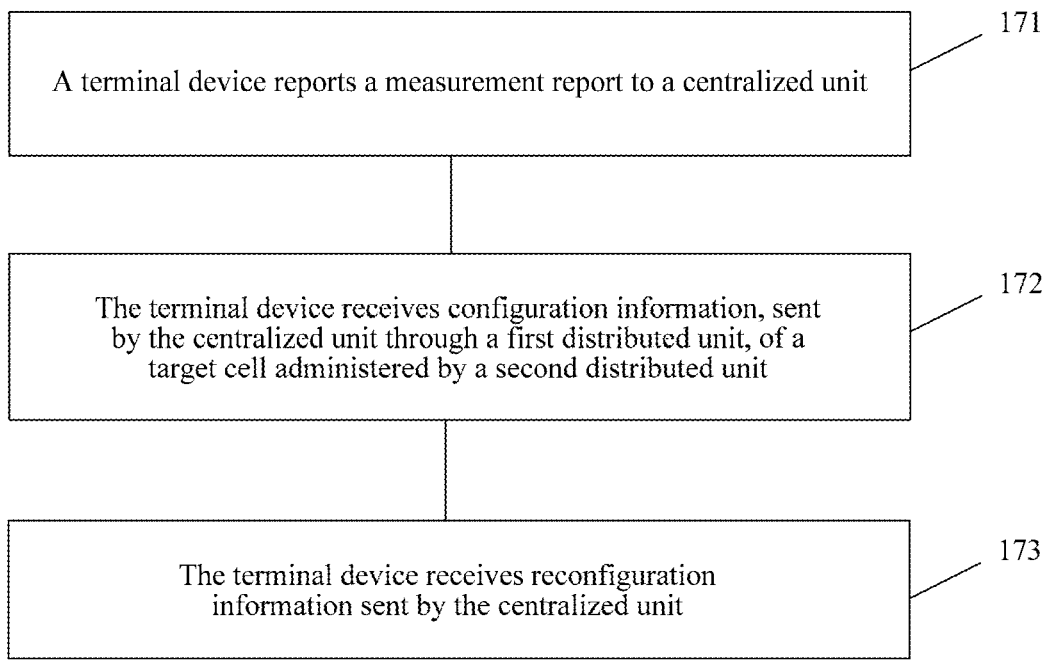
FIG. 17 is a schematic flowchart of a mobility management method according to another embodiment of the present invention.

FIG. 17 is a schematic flowchart of a mobility management method according to another embodiment of the present invention. A base station system includes a centralized unit and at least a first and a second distributed units, and the centralized unit communicates with the at least the first and the second distributed units.

Step 171. A terminal device reports a measurement report to the centralized unit.

The measurement report is used by the centralized unit to select the second distributed unit as a secondary base station.

Step 172. The terminal device receives configuration information, sent by the centralized unit through the first distributed unit, of a target cell administered by the second distributed unit.

Step 173. The terminal device receives reconfiguration information sent by the centralized unit.

After determining that the terminal device needs to perform a primary cell change between the first distributed unit and the second distributed unit, the centralized unit performs air interface resource reconfiguration for the target cell administered by the second distributed unit, and generates the reconfiguration information, and then the centralized unit sends the reconfiguration information to the terminal device through the first distributed unit.

In another embodiment of the present invention, before the centralized unit selects the second distributed unit as the secondary base station, the centralized unit allocates a C-RNTI resource pool to each of the first distributed unit and the second distributed unit, where C-RNTIs in C-RNTI resource pools are not duplicate; and the centralized unit receives an RRC connection setup request message and a C-RNTI/T-CRNTI sent by the first distributed unit, where the C-RNTI/T-CRNTI is selected, when the terminal device accesses the first distributed unit, by the first distributed unit from the C-RNTI resource pool belonging to the first distributed unit and is allocated to the terminal device.

In another embodiment of the present invention, the terminal device further receives third indication information sent by the centralized unit, where the third indication information is used to indicate that the terminal device does not need to reset a MAC layer, does not need to re-establish an RLC layer, and does not need to re-establish a PDCP layer in a primary cell change process.

In another embodiment of the present invention, the reconfiguration information includes at least an SRB configuration.

Figure 18:
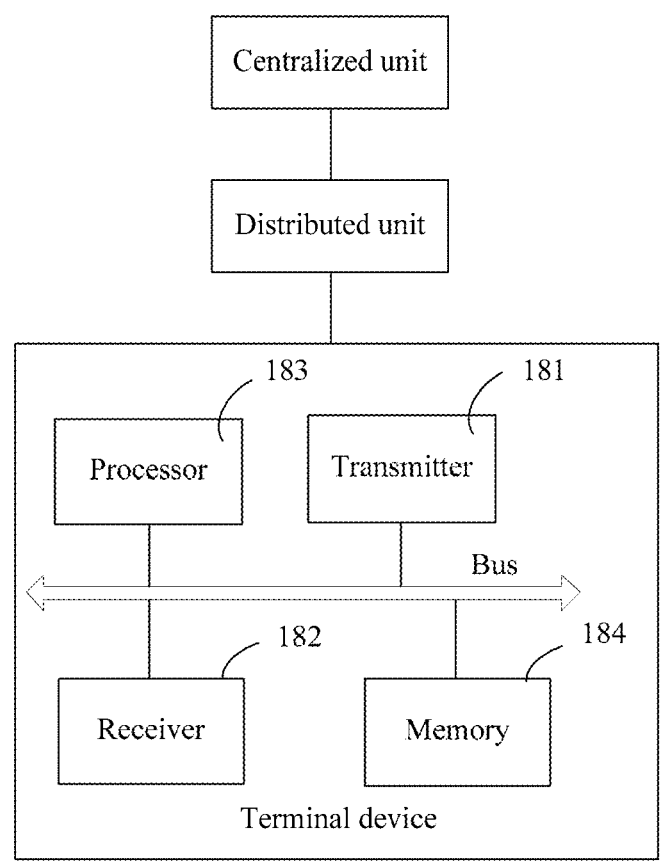
FIG. 18 is a schematic structural diagram of a communications system according to another embodiment of the present invention.

FIG. 18 is a schematic structural diagram of a communications system according to another embodiment of the present invention. A base station system includes a centralized unit and a distributed unit. The centralized unit communicates with the distributed unit. The distributed unit communicates with a shown terminal device through an air interface. The terminal device includes a transmitter 181, a receiver 182, a processor 183, and a memory 184. The transmitter 181, the receiver 182, the processor 183, and the memory 184 communicate with each other through a bus.

In this embodiment of this application, the processor 183 may be an EPLD, an FPGA, a DSP chip, an ASIC or another programmable logic device, a discrete gate or transistor logic device, a discrete hardware component, or the like.

The memory 184 is configured to store code or instruction information, and may further store information about a device type. The memory 184 may include a ROM and a RAM, and is configured to provide an instruction and data for the processor 183. A part of the memory 184 may further include a non-volatile random access memory.

The transmitter 181 is configured to report a measurement report to the centralized unit, where the measurement report is used by the centralized unit to select a target cell as a secondary cell.

The receiver 182 is configured to receive reconfiguration information of the target cell sent by the centralized unit through the distributed unit.

The reconfiguration information is generated when air interface resource reconfiguration is performed for the target cell after the centralized unit receives primary cell change indication information sent by the distributed unit.

In another embodiment of the present invention, after the centralized unit sends the configuration information of the target cell to the terminal device through the distributed unit and the centralized unit sends activation indication information to the distributed unit, the receiver 182 is further configured to receive a PDCCH activation command sent by the distributed unit, and the processor 183 is configured to activate the target cell according to the PDCCH activation command, where the activation indication information is used to instruct the distributed unit to send the PDCCH activation command to the terminal device, and the PDCCH activation command is used to instruct the terminal device to activate the target cell.

In another embodiment of the present invention, after the centralized unit sends the configuration information of the target cell to the terminal device through the distributed unit and before the centralized unit receives activation acknowledgment indication information sent by the distributed unit, the receiver 182 is further configured to receive a PDCCH activation command sent by the distributed unit, and the processor 183 is configured to activate the target cell according to the PDCCH activation command, where the PDCCH activation command is used to instruct the terminal device to activate the target cell, and the activation acknowledgment indication information is used to indicate, to the centralized unit, that the target cell has been activated.

In another embodiment of the present invention, the receiver 182 is further configured to receive first indication information sent by the centralized unit through the distributed unit, where the first indication information is used to indicate that the processor 183 does not need to re-establish an RLC layer and/or does not need to re-establish a PDCP layer in a primary cell change process.

In another embodiment of the present invention, the centralized unit sends second indication information to the distributed unit, where the second indication information is used to indicate that the distributed unit does not need to re-establish an RLC layer.

In another embodiment of the present invention, the reconfiguration information includes at least one of the following: an SRB configuration and a PUCCH configuration.

Figure 19:
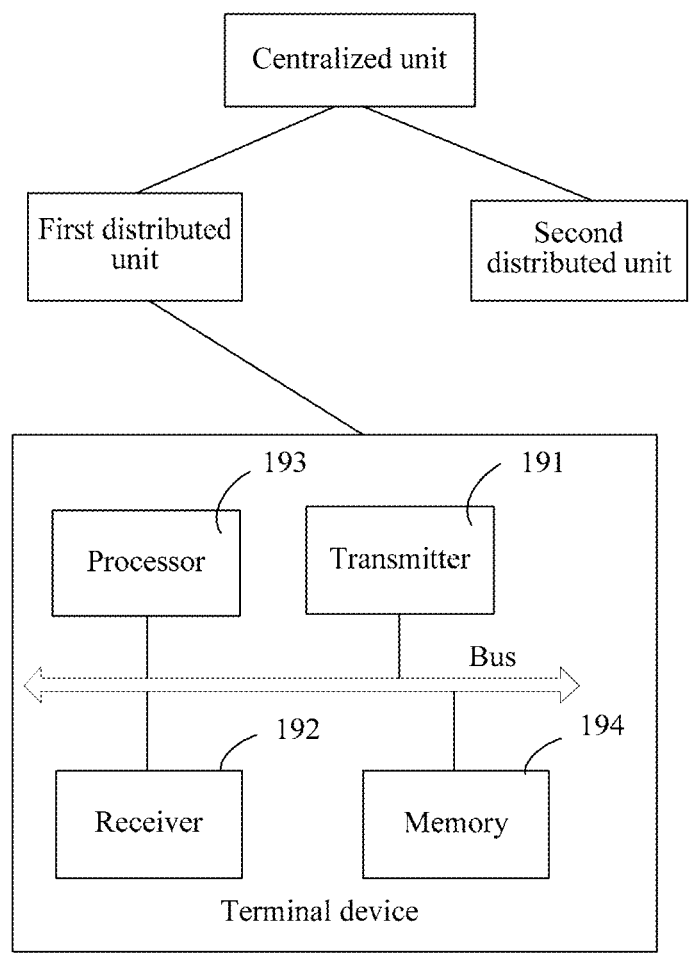
FIG. 19 is a schematic structural diagram of a communications system according to another embodiment of the present invention.

FIG. 19 is a schematic structural diagram of a communications system according to another embodiment of the present invention. A base station system includes a centralized unit and at least a first and a second distributed units, and the centralized unit communicates with the at least the first and the second distributed units. A terminal device includes a transmitter 191, a receiver 192, a processor 193, and a memory 194. The transmitter 191, the receiver 192, the processor 193, and the memory 194 communicate with each other through a bus.

In this embodiment of this application, the processor 193 may be an EPLD, an FPGA, a DSP chip, an ASIC or another programmable logic device, a discrete gate or transistor logic device, a discrete hardware component, or the like.

The memory 194 is configured to store code or instruction information, and may further store information about a device type. The memory 194 may include a ROM and a RAM, and is configured to provide an instruction and data to the processor 193. A part of the memory 194 may further include a non-volatile random access memory.

The transmitter 191 is configured to report a measurement report to the centralized unit.

The measurement report is used by the centralized unit to select the second distributed unit as a secondary base station.

The receiver 192 is configured to receive reconfiguration information, sent by the centralized unit through the first distributed unit, of a target cell administered by the second distributed unit.

After determining that the terminal device needs to perform a primary cell change between the first distributed unit and the second distributed unit, the centralized unit performs air interface resource reconfiguration for the target cell administered by the second distributed unit, and generates the reconfiguration information, and then the centralized unit sends the reconfiguration information to the terminal device through the first distributed unit.

In another embodiment of the present invention, before the centralized unit selects the second distributed unit as the secondary base station, the centralized unit allocates a C-RNTI resource pool to each of the first distributed unit and the second distributed unit, where C-RNTIs in C-RNTI resource pools are not duplicate; and the centralized unit receives an RRC connection setup request message and a C-RNTI/T-CRNTI sent by the first distributed unit, where the C-RNTI/T-CRNTI is selected, when the terminal device accesses the first distributed unit, by the first distributed unit from the C-RNTI resource pool belonging to the first distributed unit and is allocated to the terminal device.

In another embodiment of the present invention, the receiver 192 is further configured to receive third indication information sent by the centralized unit, where the third indication information is used to indicate that the processor 193 does not need to reset a MAC layer, does not need to re-establish an RLC layer, and does not need to re-establish a PDCP layer in a primary cell change process.

In another embodiment of the present invention, the reconfiguration information includes at least an SRB configuration.

Figure 20:
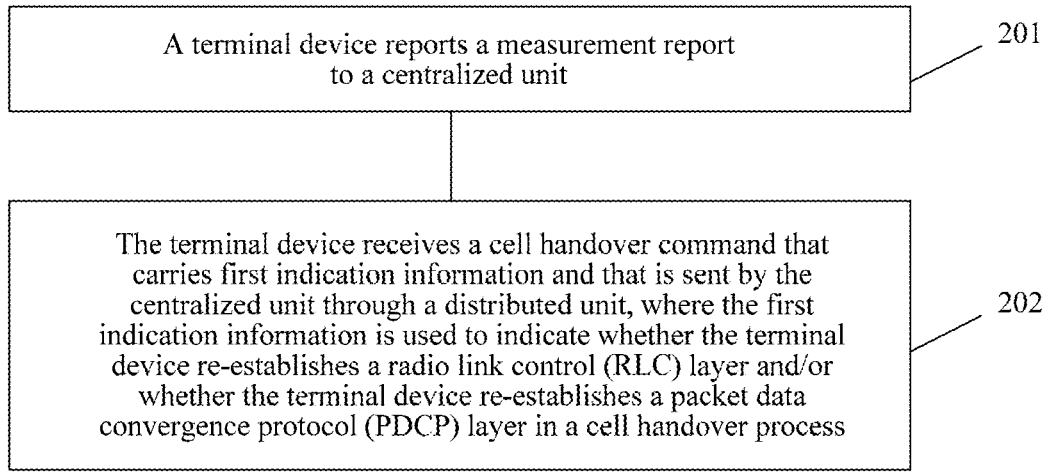
FIG. 20 is a schematic flowchart of a mobility management method according to another embodiment of the present invention.

FIG. 20 is a schematic flowchart of a mobility management method according to another embodiment of the present invention. A base station system includes a centralized unit and at least one distributed unit. The centralized unit communicates with the at least one distributed unit. The at least one distributed unit communicates with a terminal device through an air interface.

Step 201. The terminal device reports a measurement report to the centralized unit.

The measurement report is used by the centralized unit to determine that the terminal device needs to perform cell handover.

Step 202. The terminal device receives a cell handover command that carries first indication information and that is sent by the centralized unit through the distributed unit, where the first indication information is used to indicate whether the terminal device re-establishes a radio link control (RLC) layer and/or whether the terminal device re-establishes a packet data convergence protocol (PDCP) layer in a cell handover process.

In another embodiment of the present invention, when the terminal device performs cell handover between different cells administered by a same distributed unit and does not perform a key update, the first indication information is used to indicate that the terminal device does not need to re-establish the RLC layer and does not need to re-establish the PDCP layer in the cell handover process.

In another embodiment of the present invention, the centralized unit sends second indication information to the distributed unit, where the second indication information is used to indicate that the distributed unit does not need to re-establish the RLC layer.

In another embodiment of the present invention, when the terminal device performs cell handover between different cells administered by a same distributed unit and performs a key update, the first indication information is used to indicate that the terminal device needs to re-establish the RLC layer and needs to re-establish the PDCP layer in the cell handover process. In another embodiment of the present invention, the first indication information is a parameter related to a key update, and the parameter is used to instruct the terminal device to perform a key update, and implicitly indicate that the terminal device needs to re-establish the RLC layer and re-establish the PDCP layer in the cell handover process.

In another embodiment of the present invention, the centralized unit sends third indication information to the distributed unit, where the third indication information includes an identifier used to indicate a target cell to which the terminal device performs cell handover, and air interface resource configuration information corresponding to the target cell.

In another embodiment of the present invention, when the terminal device performs cell handover between cells administered by different distributed units and does not perform a key update, the first indication information is used to indicate that the terminal device does not need to reset a media access control (MAC) layer, does not need to re-establish the RLC layer, and does not need to re-establish the PDCP layer in the cell handover process.

Figure 21:
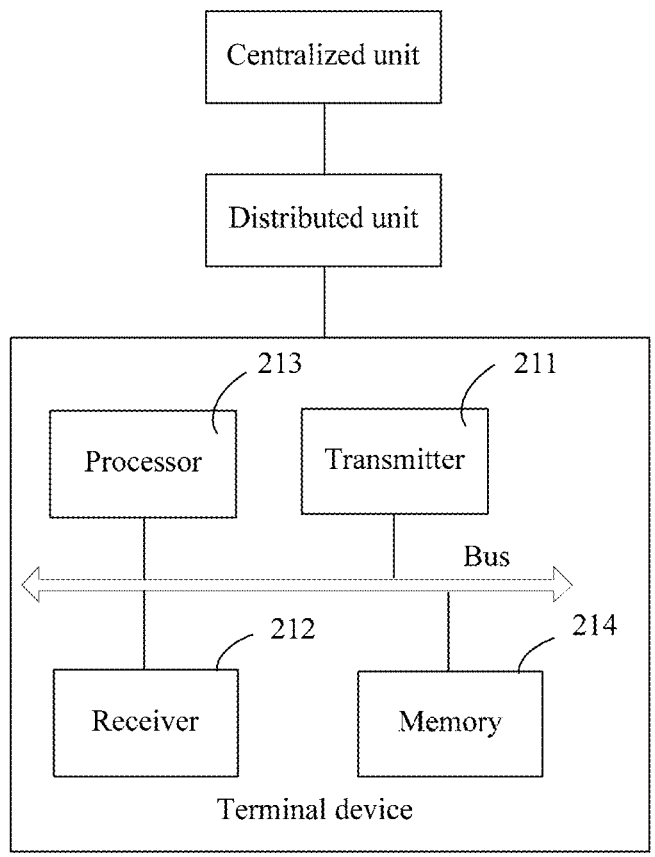
FIG. 21 is a schematic structural diagram of a communications system according to another embodiment of the present invention.

FIG. 21 is a schematic structural diagram of a communications system according to another embodiment of the present invention. A base station system includes a centralized unit and at least one distributed unit. The centralized unit communicates with the at least one distributed unit. The at least one distributed unit communicates with a terminal device through an air interface. The terminal device includes a transmitter 211, a receiver 212, a processor 213, and a memory 214. The transmitter 211, the receiver 212, the processor 213, and the memory 214 communicate with each other through a bus.

In this embodiment of this application, the processor 213 may be an EPLD, an FPGA, a DSP chip, an ASIC or another programmable logic device, a discrete gate or transistor logic device, a discrete hardware component, or the like.

The memory 214 is configured to store code or instruction information, and may further store information about a device type. The memory 214 may include a ROM and a RAM, and is configured to provide an instruction and data for the processor 213. A part of the memory 214 may further include a non-volatile random access memory.

The transmitter 211 is configured to report a measurement report to the centralized unit.

The measurement report is used by the centralized unit to determine that the terminal device needs to perform cell handover.

The receiver 212 is configured to receive a cell handover command that carries first indication information and that is sent by the centralized unit through the distributed unit, where the first indication information is used to indicate whether the terminal device re-establishes a radio link control (RLC) layer and/or whether the terminal device re-establishes a packet data convergence protocol (PDCP) layer in a cell handover process.

In another embodiment of the present invention, when the terminal device performs cell handover between different cells administered by a same distributed unit and does not perform a key update, the first indication information is used to indicate that the processor 213 does not need to re-establish the RLC layer and does not need to re-establish the PDCP layer in the cell handover process.

In another embodiment of the present invention, the centralized unit sends second indication information to the distributed unit, where the second indication information is used to indicate that the distributed unit does not need to re-establish the RLC layer.

In another embodiment of the present invention, when the terminal device performs cell handover between different cells administered by a same distributed unit and performs a key update, the first indication information is used to indicate that the processor 213 needs to re-establish the RLC layer and needs to re-establish the PDCP layer in the cell handover process. In another embodiment of the present invention, the first indication information is a parameter related to a key update, and the parameter is used to instruct the terminal device to perform a key update, and implicitly indicate that the processor 213 needs to re-establish the RLC layer and re-establish the PDCP layer in the cell handover process.

In another embodiment of the present invention, the centralized unit sends third indication information to the distributed unit, where the third indication information includes an identifier used to indicate a target cell to which the terminal device performs cell handover, and air interface resource configuration information corresponding to the target cell.

In another embodiment of the present invention, when the terminal device performs cell handover between cells administered by different distributed units and does not perform a key update, the first indication information is used to indicate that the processor 213 does not need to reset a media access control (MAC) layer, does not need to re-establish the RLC layer, and does not need to re-establish the PDCP layer in the cell handover process.

Each of the foregoing embodiments described in FIG. 16 to FIG. 21 is described briefly from a terminal device side. For a specific process and a carried parameter, refer to content described in the embodiments corresponding to FIG. 2 to FIG. 15. Details are not described herein again.

In an implementation process, steps in the foregoing methods may be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and performs the steps in the foregoing methods in combination with hardware of the processor. To avoid repetition, details are not described herein again. A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and designs of the technical solutions. A person skilled in the art may use different methods to implement the described functions for each particular application, but it should not be considered that the implementation goes beyond the scope of the present invention.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to execute all or some of the steps of the methods described in the embodiments of the present invention. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of the present invention. Therefore, the protection scope of this application shall be subject to the protection scope of the claims.

What is claimed is:

1. A mobility management method, wherein a base station system comprises a centralized unit and at least a first and a second distributed units, and the centralized unit communicates with the at least the first and the second distributed units, wherein the method comprises:
    allocating, by the centralized unit, a cell-radio network temporary identifier (C-RNTI) resource pool to each of the first distributed unit and the second distributed unit, wherein C-RNTIs in C-RNTI resource pools are not duplicate;
    receiving, by the centralized unit, a radio resource control (RRC) connection setup request message and a C-RNTI/T-CRNTI sent by the first distributed unit, wherein the C-RNTI/T-CRNTI is selected, when a terminal device accesses the first distributed unit, by the first distributed unit from the C-RNTI resource pool belonging to the first distributed unit and is allocated to the terminal device;
    selecting, by the centralized unit, the second distributed unit as a secondary base station based on a measurement report reported by the terminal device;
    sending configuration information of a target cell administered by the second distributed unit to the terminal device through the first distributed unit;
    determining, by the centralized unit, that the terminal device needs to perform a primary cell change between the first distributed unit and the second distributed unit;
    performing air interface resource reconfiguration for the target cell administered by the second distributed unit;
    generating reconfiguration information; and
    sending, by the centralized unit, the reconfiguration information to the terminal device.

2. The method according to claim 1, wherein the method further comprises: sending, by the centralized unit, third indication information to the terminal device, wherein the third indication information indicates that the terminal device does not need to reset a media access control (MAC) layer, does not need to re-establish a radio link control (RLC) layer, and does not need to re-establish a packet data convergence protocol (PDCP) layer in a primary cell change process.

3. The method according to claim 1, wherein the reconfiguration information comprises at least a signaling radio bearer (SRB) configuration.

4. A base station, comprising:
    a centralized unit and at least a first and a second distributed units, and wherein the centralized unit comprises:
        at least one processor;
        one or more non-transitory computer-readable storage medium coupled to the at least one processor and storing programming instructions for execution by the at least one processor, wherein the programming instructions, when executed, cause the centralized unit to perform operations comprising:
            allocating, by the centralized unit, a cell-radio network temporary identifier (C-RNTI) resource pool to each of the first distributed unit and the second distributed unit, wherein C-RNTIs in C-RNTI resource pools are not duplicate;
            receiving, by the centralized unit, a radio resource control (RRC) connection setup request message and a C-RNTI/T-CRNTI sent by the first distributed unit, wherein the C-RNTI/T-CRNTI is selected, when a terminal device accesses the first distributed unit, by the first distributed unit from the C-RNTI resource pool belonging to the first distributed unit and is allocated to the terminal device;
            selecting, by the centralized unit, the second distributed unit as a secondary base station based on a measurement report reported by the terminal device;
            sending configuration information of a target cell administered by the second distributed unit to the terminal device through the first distributed unit;
            determining, by the centralized unit, that the terminal device needs to perform a primary cell change between the first distributed unit and the second distributed unit;
            performing air interface resource reconfiguration for the target cell administered by the second distributed unit;
            generating reconfiguration information; and
            sending, by the centralized unit, the reconfiguration information to the terminal device.

5. The base station according to claim 4, wherein the operations further comprise: sending, by the centralized unit, third indication information to the terminal device, wherein the third indication information indicates that the terminal device does not need to reset a media access control (MAC) layer, does not need to re-establish a radio link control (RLC) layer, and does not need to re-establish a packet data convergence protocol (PDCP) layer in a primary cell change process.

6. The base station according to claim 4, wherein the reconfiguration information comprises at least a signaling radio bearer (SRB) configuration.

7. One or more non-transitory computer-readable media storing computer instructions, that when executed by one or more processors, cause a computing device to perform operations comprising:
- allocating, by a centralized unit of a base station that comprises at least a first and a second distributed units, a cell-radio network temporary identifier (C-RNTI) resource pool to each of the first distributed unit and the second distributed unit, wherein C-RNTIs in C-RNTI resource pools are not duplicate;
- receiving, by the centralized unit, a radio resource control (RRC) connection setup request message and a C-RNTI/T-CRNTI sent by the first distributed unit, wherein the C-RNTI/T-CRNTI is selected, when a terminal device accesses the first distributed unit, by the first distributed unit from the C-RNTI resource pool belonging to the first distributed unit and is allocated to the terminal device;
- selecting, by the centralized unit, the second distributed unit as a secondary base station based on a measurement report reported by the terminal device;
- sending configuration information of a target cell administered by the second distributed unit to the terminal device through the first distributed unit;
- determining, by the centralized unit, that the terminal device needs to perform a primary cell change between the first distributed unit and the second distributed unit;
- performing air interface resource reconfiguration for the target cell administered by the second distributed unit;
- generating reconfiguration information; and
- sending, by the centralized unit, the reconfiguration information to the terminal device.

8. The base station according to claim 7, wherein the operations further comprise: sending, by the centralized unit, third indication information to the terminal device, wherein the third indication information indicates that the terminal device does not need to reset a media access control (MAC) layer, does not need to re-establish a radio link control (RLC) layer, and does not need to re-establish a packet data convergence protocol (PDCP) layer in a primary cell change process.

9. The base station according to claim 7, wherein the reconfiguration information comprises at least a signaling radio bearer (SRB) configuration.

* * * * *